(12) United States Patent
Powell et al.

(10) Patent No.: US 11,706,264 B2
(45) Date of Patent: Jul. 18, 2023

(54) VIRTUAL POSITION BASED MANAGEMENT OF COLLABORATION SESSIONS

(71) Applicant: Cisco Technology, Inc., San Jose, CA (US)

(72) Inventors: Brian C. Powell, El Segundo, CA (US); Amit Barave, Sunnyvale, CA (US); Carl Nathan Buckles, McKinney, TX (US); Vaishnavi Rao, Santa Clara, CA (US); Tiffany Kristine Pham, Petaluma, CA (US); Sofia Karygianni, Dubendorf (CH); David C. White, Jr, St. Petersburg, FL (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 0 days.

(21) Appl. No.: 17/385,350

(22) Filed: Jul. 26, 2021

(65) Prior Publication Data

US 2023/0028265 A1    Jan. 26, 2023

(51) Int. Cl.
| | | |
|---|---|---|
| *H04L 65/1083* | (2022.01) | |
| *H04L 12/18* | (2006.01) | |
| *G06F 3/16* | (2006.01) | |
| *H04L 65/4038* | (2006.01) | |

(52) U.S. Cl.
CPC .......... *H04L 65/1083* (2013.01); *G06F 3/165* (2013.01); *H04L 12/1822* (2013.01); *H04L 65/4015* (2013.01); *H04L 65/4038* (2013.01)

(58) Field of Classification Search
CPC ........... H04L 12/1813; H04L 12/1822; H04L 65/401; H04L 65/4015; H04L 65/403; H04L 65/4038; H04M 3/564; H04M 3/567; H04M 3/568; H04N 7/15; H04N 7/157; H04L 65/1066; H04L 65/1069; H04L 65/1083; H04L 65/1093
See application file for complete search history.

(56) References Cited

U.S. PATENT DOCUMENTS

| | | | | |
|---|---|---|---|---|
| 7,840,668 B1* | 11/2010 | Sylvain et al. | ....... | H04L 67/131 709/224 |
| 10,979,671 B1* | 4/2021 | McElroy | ............... | H04N 7/157 |
| 11,258,836 B1* | 2/2022 | Ou | ..................... | H04L 65/4015 |

(Continued)

OTHER PUBLICATIONS

Sharma et al., WO 2012/053001 A2, 2012-04, WIPO, G06Q 10/10 (Year: 2012).*

(Continued)

*Primary Examiner* — Vivek Srivastava
*Assistant Examiner* — William C McBeth
(74) *Attorney, Agent, or Firm* — Edell, Shapiro & Finnan, LLC

(57) ABSTRACT

Improved virtual collaboration environments allow participants in a primary collaboration session to initiate side conversations with fellow participants based on virtual locations of each participant within a virtual collaboration layout. The virtual collaboration layout defines virtual locations of each participant in the collaboration session. If a virtual distance between two participants a below a threshold, the participants are able to engage in a side conversation. Management information is provided to a collaboration session host. The management information indicates, for example, a volume or frequency of communication occurring on each side conversation, or an elapsed time since the side conversation was initiated. The host is also provided with controls that allow the host to issue a warning to side conversation participants, to mute the side conversation, or to change a participant's position within the virtual collaboration layout, thus changing the participant's eligibility to participate in the side conversation.

23 Claims, 25 Drawing Sheets

(56) References Cited

U.S. PATENT DOCUMENTS

| | | | |
|---|---|---|---|
| 11,343,293 B1* | 5/2022 | Slotznick | H04L 65/4015 |
| 11,405,436 B1* | 8/2022 | Mindlin et al. | H04L 65/403 |
| 2003/0234859 A1* | 12/2003 | Malzbender et al. | H04N 7/147 |
| | | | 348/14.05 |
| 2005/0078613 A1* | 4/2005 | Covell et al. | H04L 65/4038 |
| | | | 370/260 |
| 2005/0271194 A1* | 12/2005 | Woods et al. | H04L 65/403 |
| | | | 455/518 |
| 2010/0251142 A1* | 9/2010 | Geppert et al. | H04L 12/1822 |
| | | | 715/758 |
| 2011/0103624 A1 | 5/2011 | Ferren | |
| 2012/0017149 A1* | 1/2012 | Lai et al. | H04L 65/403 |
| | | | 715/758 |
| 2012/0308044 A1* | 12/2012 | Vander Mey et al. | |
| | | | H04L 12/1822 |
| | | | 381/104 |
| 2012/0331397 A1* | 12/2012 | Eidelson et al. | G06Q 10/107 |
| | | | 715/751 |
| 2014/0085406 A1* | 3/2014 | Narayanan | H04L 65/4038 |
| | | | 348/14.09 |
| 2016/0344567 A1 | 11/2016 | Navale et al. | |
| 2017/0353694 A1 | 12/2017 | Yoakum | |
| 2020/0028883 A1 | 1/2020 | Childers et al. | |
| 2020/0059561 A1 | 2/2020 | Murali et al. | |
| 2021/0352244 A1* | 11/2021 | Benedetto et al. | H04N 7/157 |
| 2021/0385263 A1* | 12/2021 | Churchill | H04L 65/4015 |
| 2022/0014712 A1* | 1/2022 | Cordourier Maruri et al. | |
| | | | H04M 3/568 |
| 2022/0086203 A1* | 3/2022 | Morris et al. | H04N 7/157 |
| 2022/0109810 A1* | 4/2022 | Kancharlawar et al. | |
| | | | H04N 7/157 |
| 2022/0124286 A1* | 4/2022 | Punwani et al. | H04L 12/1822 |
| 2022/0157342 A1* | 5/2022 | Kliushkin et al. | G11B 27/06 |

OTHER PUBLICATIONS

Stevens et al., WO 2021/247767 A1, 2021-12, WIPO, H04L 12/1822 (Year: 2021).*

* cited by examiner

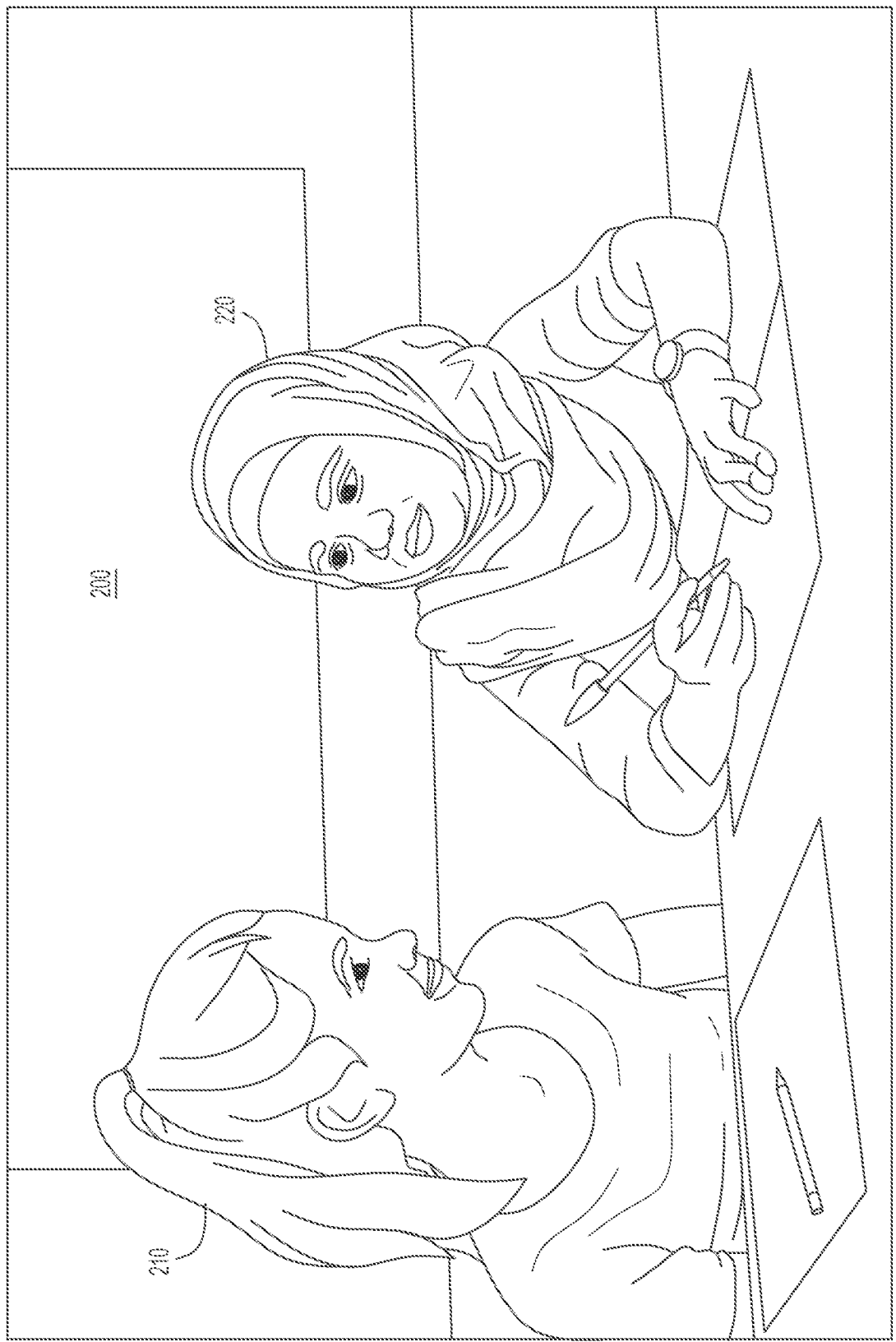

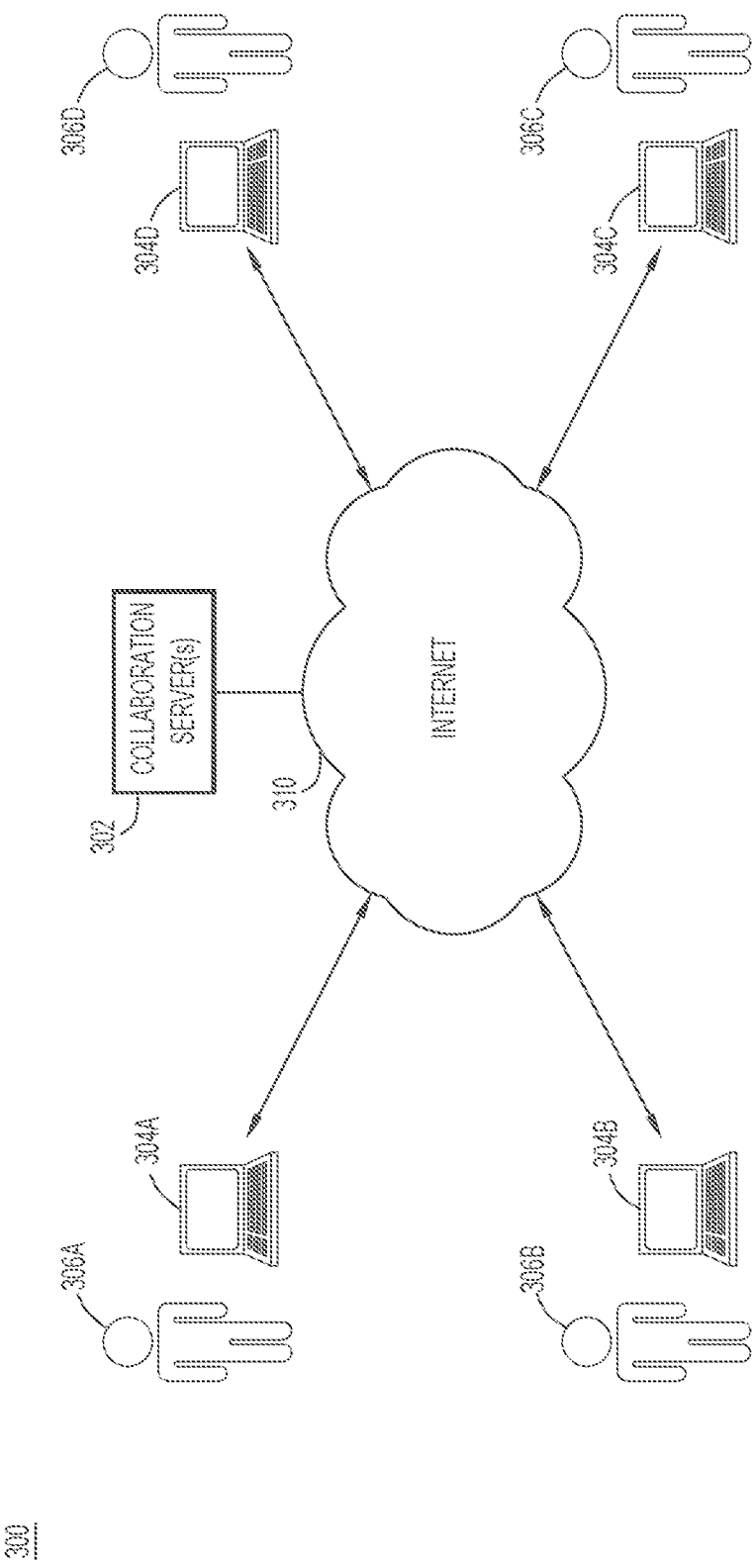

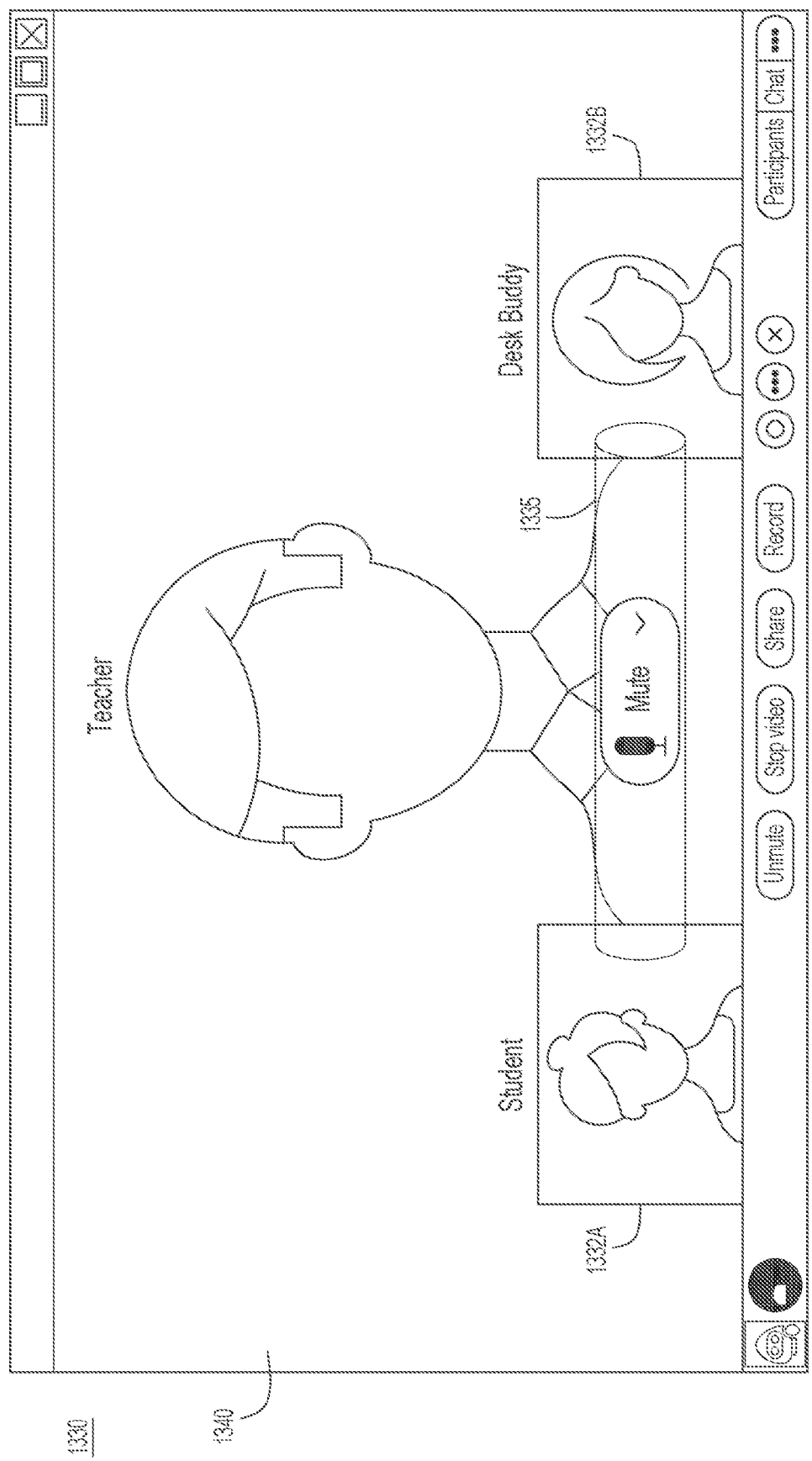

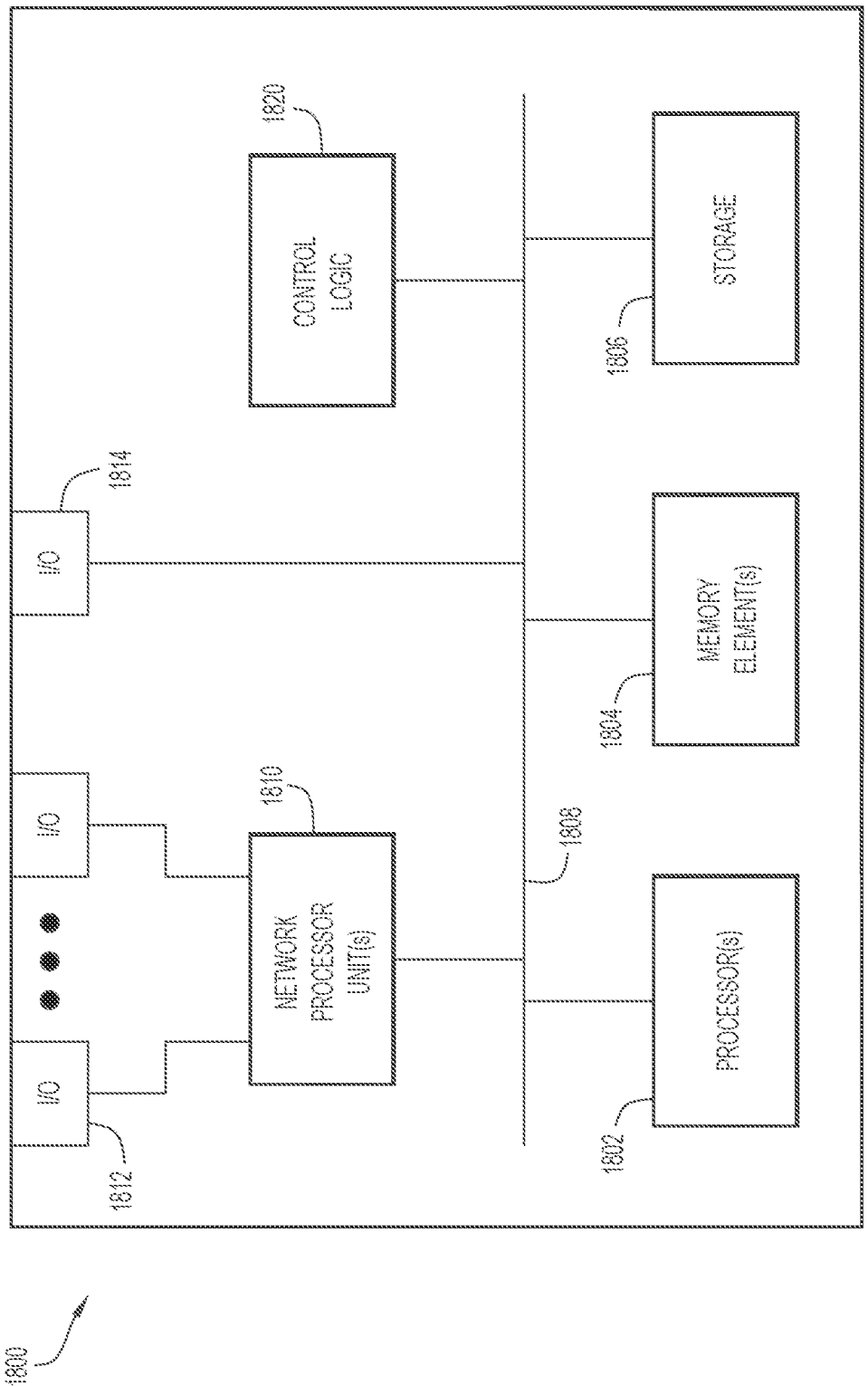

US 11,706,264 B2

VIRTUAL POSITION BASED MANAGEMENT OF COLLABORATION SESSIONS

TECHNICAL FIELD

The present disclosure relates to online/virtual collaboration sessions and learning environments.

BACKGROUND

Virtual collaboration has gained popularity in recent years. An ability to foster communication between large groups of people, sometimes spread out over large geographic areas, has enabled cost effective communication and problem solving on a scale never before possible. The recent pandemic further solidified use of virtual collaboration as an essential business tool. During the pandemic, businesses that might otherwise be required to shut down were able to maintain business operations. Risky personal contact could be avoided, leading to improved safety relative to in-person meetings. While virtual collaboration provides many benefits, it does not fully replicate all of the benefits of in-person meetings.

BRIEF DESCRIPTION OF THE FIGURES

FIGS. 1 and 2 show examples of students interacting informally while a larger class (e.g. a collaboration session) is in progress.

FIG. 3 is a block diagram of a system configured to support virtual position based management of participants in a collaboration session, according to an example embodiment.

FIG. 13B illustrates a user interface presented to a participant in a side conversation in accordance with an example embodiment.

FIG. 18 is a hardware block diagram of a device that may perform functions associated with operations discussed herein in connection with the techniques depicted in any one or more of FIGS. 1-17.

DESCRIPTION OF EXAMPLE EMBODIMENTS

Overview

Figure 4A:
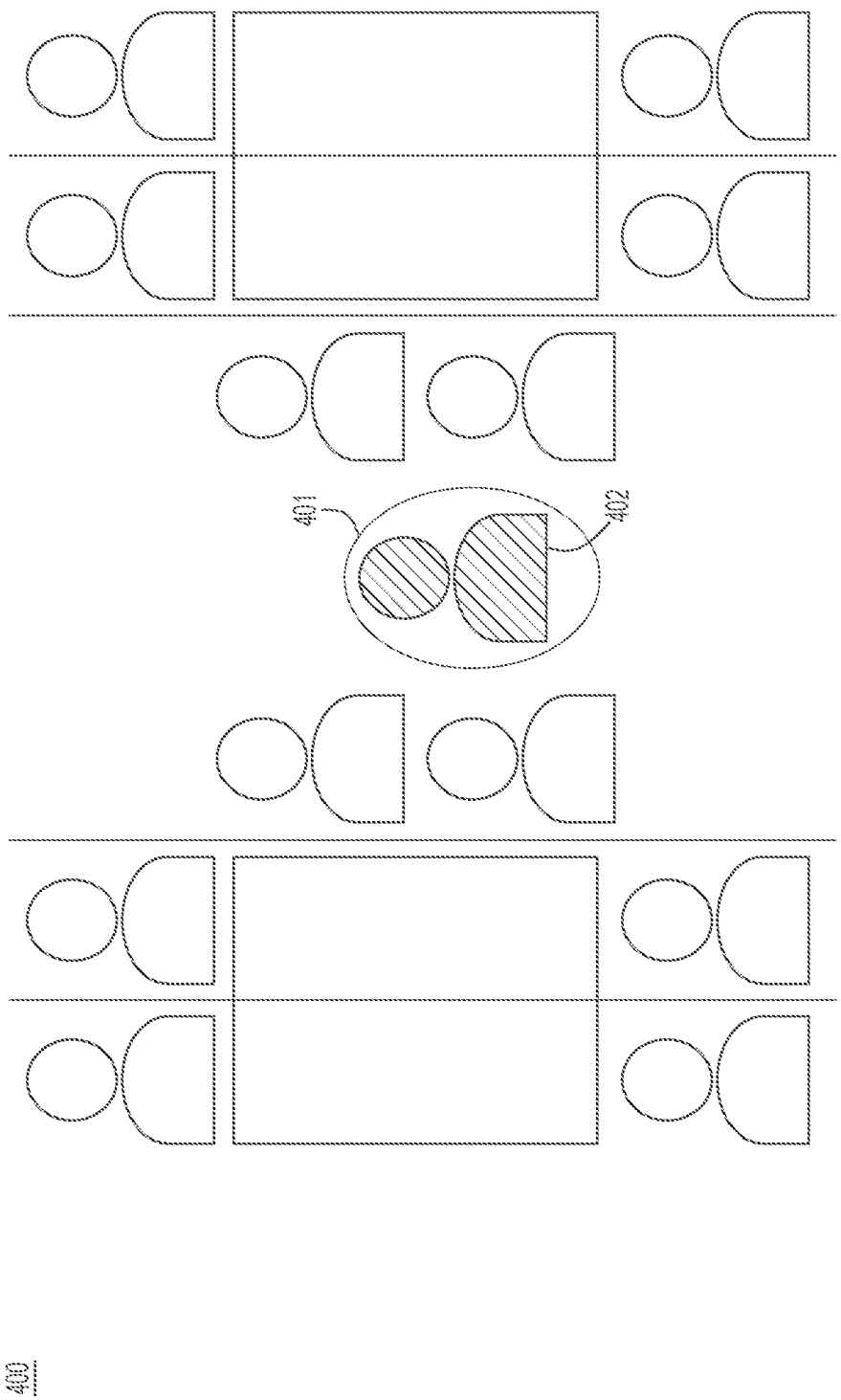
FIG. 4A illustrates a first virtual position of a collaboration session host relative to other collaboration session participants according to an example embodiment.

The disclosed embodiments provide for side conversations within a collaboration session based on virtual positions of participants in the collaboration session. In one aspect, a method is performed that includes establishing a plurality of communication sessions with a plurality of client devices, establishing a first collaboration session that integrates first communications of the plurality of communication sessions, obtaining data defining relative positions of a plurality of icons to be presented on displays of the plurality of client devices, each of the plurality of icons associated with a respective one of the communication sessions, selectively enabling an establishment of a second collaboration session that integrates second communications of two or more of the communication sessions based on relative positions of the icons associated with the two or more communication sessions, establishing the second collaboration session, and integrating the first communications of the first collaboration session into the second collaboration session.

Example Embodiments

Disclosed herein are embodiments for virtual collaboration among a plurality of participants. A collaboration server establishes a primary collaboration session that allows multiple participants to communicate. The collaboration server also supports the creation, by participants, of "side conversations" or additional collaboration sessions that include only a subset of participants of the primary collaboration session. To ensure the side conversations are properly utilized by participants and do not distract from activity of the primary collaboration session, management information is provided to a collaboration session host. The management information indicates how the side conversations are being used by participants, such as a volume, frequency, or elapsed time of the side conversations. Creation of the side conversations is conditioned on a relationship between virtual positions of participants of the primary collaboration session. Thus, as one example, participants that are virtually positioned "near" each other are permitted to establish a side conversation, while participants positioned at a further distance from each other are not allowed to engage in side conversations.

One premise of the disclosed embodiments is that much of life is based on relationships, and some of those relationships are formed in our formative years. Sometimes, those relationships are created by whom we sit next to in classes. In a physical collaboration environment, seating assignments help orient participants with the physical layout of a meeting space (e.g. a classroom, meeting room, or a conference room), their fellow participants, and the collaboration session agenda for the day. These seating arrangements also foster organic conversations between participants and offer them an opportunity to connect, build, learn from, and deepen their relationship with another participant.

Many of these conversations occur concurrently with a presentation by a host (e.g. a teacher). In some environments, a host leverages seating arrangements to foster better engagements between participants (e.g. students) or to limit disruptive interactions between one or more participants.

The ability to quickly converse with a fellow participant is readily possible in a physical collaboration meeting (e.g. a physical classroom or conference room). Virtual/Distance/Remote learning has, in many ways, disrupted these types of organic relationship building opportunities for collaboration participants. For example, with respect to learning environments, children can be especially impacted with respect to the development of social skills and an ability to build lasting friendships with their classmates.

FIGS. 1 and 2 show examples of students interacting informally while a larger class (e.g. a physical collaboration session) is in session. These informal interactions are typically facilitated, in part, by a physical position of the participants within the physical collaboration environment (e.g., a classroom or conference room). For example, FIG. 1 shows an interaction 100 between two participants/students 110 and 120 where participant/student 110 is whispering in the ear of participant/student 120. Similarly, FIG. 2 shows an interaction 200 between two students 210 and 220 that are sitting next to each other in a classroom.

Anecdotal evidence suggests that, for example, high school students highly value periods of time during a school day when they are permitted to "breakout" into smaller groups. They are allowed to talk with their friends without direct oversight by an adult, such as a teacher or other collaboration session host. Even if students are assigned an activity during these "breakout" periods, some students choose to use the time in other ways, such as, informal communication with friends.

There is currently no solution in place that provides for informal interactions between participants/students in online/virtual collaboration sessions. Embodiments are presented herein that enable two concurrent virtual collaboration sessions to be established by a participant so as to engage in a separate conversation with another participant (e.g., the participants virtual desk buddies) while simultaneously participating in a primary collaboration session (e.g. listening to audio generated by a host of the primary collaboration session), as would be the case, for example, when a student in a classroom environment whispers to a desk mate while a teacher is providing a lecture (as shown in FIG. 1). Current virtual collaboration environments do not provide an ability for friendly whispers among participants while a host is presenting (as is the case in real-life classrooms) as these solutions generally provide a collaboration session that is shared by all participants. This single collaboration session deprives participants of the opportunity to build strong friendships with other participants via side discussions (e.g. whispers). While some online collaborative applications include breakout room capability, these breakout rooms are defined, established and maintained by the host and generally force participants into particular rooms or sessions designated by the host. However, breakout rooms do not provide a host with capabilities the host might otherwise have in a physical environment to manage separate breakout groups of collaboration session participants. Moreover, traditional breakout rooms are generally centrally controlled by a host, and cannot be initiated at the participant level.

Some of the disclosed embodiments provide participants with an opportunity to restore this physical world experience within a virtual environment, while also improving an ability of a collaboration session host to control and manage these conversations. These embodiments provide for a definition of a virtual position of each participant in a collaboration session with respect to other participants. Thus, some participants are closer, within this definition, to some participants than to other participants. These embodiments then communicate, to collaboration session participants, which other participants are available for a side conversation or "whisper mode" collaboration session. By designating a relatively small group of other participants that maintain a "special relationship" with a participant (e.g. those participants within a virtual distance of the participant as defined by the virtual collaboration layout), the disclosed embodiments facilitate interactions between those participants, and can reduce awkwardness that often accompanies first meetings.

Participants can then initiate, establish, and participate in side or "whisper mode" conversations with other participants, with this ability conditioned on a virtual position of the participant in relation to a virtual position of another participant. Some embodiments provide an ability for participants in a collaboration session to raise a virtual hand, send chat messages, use gestures, verbal commands (i.e., "ok, collaboration manager") or use other reactions to communicate that they have a question, are done with an assignment, etc. Some embodiments provide a virtual host assistant that is configured to answer specific questions, act as a proxy to another system (i.e., Learning Management System (LMS) to submit assignments), respond to voice questions regarding time remaining, other schedule information, or distribute other documents. In some embodiments, the virtual host assistant is configured to manage sequences of events, for example, the completion of a first task, obtaining instructions for a second task, and then notifying a host that a group of collaboration session participants has completed a task.

In some embodiments, a collaboration session host is provided with one or more indications of status of side conversations that are occurring within the primary collaboration session. These status indications include, in some embodiments, indications of groups of participants engaged in a side conversation, an amount of time the side conversation has been ongoing, a frequency of communication within the side conversation, or other status indications. Hosts (e.g. teachers) are also provided with an ability, in at least some embodiments, to control these side conversations, for example, by muting those conversations, closing those conversations down entirely, injecting voice instructions into one or more of the side conversations, or other control/management actions.

Generally, a collaboration session host can maintain an observer role while outside of any particular side conversation, and is provided with controls to allow for an adjustment of audio so as to focus on a specific side conversation. Some embodiments provide a user interface that is configured to allow the host to display a video of an active speaker within a particular side conversation, or can select to view a particular video stream of a participant in a side conversation. Some embodiments provide a user interface to the host to allow the host to temporarily join or visit a side conversation and speak to the group, or to temporarily visit a single participant, for example when the host wants to have a private, one-on-one, collaboration session with the participant. When this occurs, in some embodiments, a particular user interface designed for one-on-one conversations is displayed to both the host and participant. This particular user interface indicates that they are in a private mode and that their audio and video is only being sent to each other. In some embodiments, the host has the option to hear audio from a primary collaboration session while also engaging in the one-on-one collaboration session.

Some embodiments provide an ability for a host to group participants into separate collaboration sessions (e.g. "break-out" sessions or even "whisper mode" sessions), and manage those sessions via the capabilities described above. Some embodiments provide a capability for a host to distribute materials to one or more of the collaboration sessions by session. These materials can include files, whiteboards, chat messages, or desktop/application sharing. Some embodiments allow a host or a host assistant to select which groups of participants are heard at full volume, and which are heard at a lower volume. For example, some embodiments implement a user interface that displays one or more virtual tables. Proximate to each virtual table are displayed avatars or icons representing a group of one or more conference participants. A host can place his/her avatar or icon on or near a table to make their own voice louder to members of a group near the table. Alternatively, the avatar can be placed next to a single student to initiate a semi-private discussion, much like might otherwise occur in an in-person environment.

In some embodiments, a host or host assistant is provided with a capability to connect to multiple side conversations (e.g., multiple collaboration sessions) simultaneously. In some embodiments, invoking this capability allows the host or host assistant to communicate with all of the multiple collaboration sessions simultaneously. In other embodiments, the host or host assistant is provided with controls that allow individual collaboration sessions of the multiple collaboration sessions to be selected and then addressed.

Some embodiments support a variety of audio mix configurations. For example, in a first audio configuration, audio generated by a plurality of groups or collaboration sessions is provided to a collaboration server, which then mixes audio streams of participants to a defined level and then provides the integrated audio stream to a host device. In a second configuration, audio streams of members of each group are mixed by the collaboration server into separate streams, and the host device is provided with each of the separate streams. Each participant of each group receives the audio stream of their respective group. In a third audio configuration, the second audio configuration remains in effect, with an addition of any separate audio streams resulting from provide conversations between two participants. These separate audio streams are mixed by the collaboration server and then provided to the host device. In a fourth audio configuration, audio streams generated by each participant are provided to the host device, and the host device mixes the audio streams according to configuration parameters set by the host.

Depending on which audio configuration is operative, the collaboration server or the client device will determine which audio streams to provide to the host and at what volume. In some embodiments, this determination is based on an audio setting at a client device of the host. In some embodiments, a user interface is presented to the host that includes individual volume controls for one or more audio channels generated by participants in a collaboration session. Some embodiments implement a container design pattern, and provide different audio containers, each with a different granularity (i.e., shared with entire collaboration session, shared within a side conversation, shared with an individual participant, or other options).

Thus, these embodiments provide the best of both worlds. Participants can whisper to their desk buddy (just like in the physical world) while the host is provided with an ability to observe and manage these additional collaboration sessions (side conversations). The result is a virtual collaboration environment that is more akin to a real/physical-world experience.

FIG. 3 is an overview diagram illustrating a collaboration system according to an example embodiment. The collaboration system 300 of FIG. 3 includes a collaboration server 302, and four participant client (or user) devices, shown as client device 304A, client device 304B, client device 304C, and client device 304D. A participant is associated with each client device. For example, participant 306A is associated with client device 304A, participant 306B is associated with client device 304B, participant 306C is associated with client device 304C, and participant 306D is associated with client device 304D. While four participants and four participant client devices are shown in FIG. 3, various embodiments include any number of client devices, and the disclosed embodiments are not limited to the example of FIG. 3. Each of the client devices 304A-D establishes a communication session with the collaboration server 302 via one or more networks that are simply represented as the Internet 310. The collaboration server 302 provides various collaboration services (audio communication, video communication, sharing of content, etc.). In some embodiments, the communication sessions are established based on credentials (e.g., account name and/or password) associated with an account established with a collaboration service that is provided by the collaboration server 302. The credentials identify a particular participant or user of the collaboration service provided by the collaboration server 302. Each communication session provides audio and/or video information from its respective client device to the collaboration server 302. The collaboration server 302 determines how to mix audio and/or video information received from the client devices 304A-D, and provides, to each of the client devices 304A-D, a customized mix of audio and video data generated from the information received from the client devices 304A-D.

The client devices 304A-D may be desktop computers, laptop computers, tablet devices, smartphone devices, a dedicated video collaboration device, or any other suitable user device now known or hereinafter developed that has network connectivity, a display, a camera, and a microphone, as well as a keyboard and mouse, touch-screen display or other similar touch-based or non-touch/gesture base user interface.

The collaboration server 302 provides a collaboration session that integrates one or more of audio or video channels generated by the participant client devices 304A-D, and provides the integrated channels back to the participant client devices. In some embodiments, the integration of the channels is customized for each of the participant device devices 304A-D by the collaboration server 302. For example, in some embodiments, a video feed generated by a client device is displayed in a particular location on the client device. Thus, in this example, each video channel provided by the collaboration server to the client devices is customized for the particular client device. The customization of channels provided to each of the client devices is also based, in some embodiments, on any membership of a participant in a side conversation, as discussed below. To distinguish the collaboration session integrating the participant client devices 304A-D from side conversations discussed below, the collaboration session discussed above is referred to as a "primary collaboration session."

The collaboration server 302 is configured to selectively enable the initiation of side conversations or "whisper mode" conversations between a subset of participants attending a collaboration session. The side conversations are themselves collaboration sessions, but are distinguished from the primary collaboration session in that they include a subset of participants of the primary collaboration session. The selective enablement is based, in at least some embodiments, on a positional relationship between virtual seat assignments of each participant attending a collaboration session. The virtual seat assignments form a virtual collaboration layout of participants in a collaboration session. Thus, for example, the virtual collaboration layout defines, in an example embodiment, that participant 306A is closer to participant 306C than to participant 306B. In some embodiments, as discussed further below, side conversations between participants are selectively enabled based on a virtual distance between two virtual positions of two participants within the virtual collaboration layout.

A side conversation includes, in some embodiments, one or more of audio or video channel information from participants of the side conversation. The side conversation also includes, in some embodiments, audio or video information from participants of the primary collaboration session that are excluded from the side conversation itself. Generally, a participant of a side conversation receives video and/or audio of participants excluded from the side conversation, while participants excluded from the side conversation do not receive audio or video from participants included in the side conversation, although there are some exceptions to this rule, as discussed below.

FIG. 4A illustrates a virtual collaboration layout 400 that includes a first virtual position 401 of a collaboration session host 402, or just "host" for short, relative to other collaboration session participants according to an example embodiment. In the example of FIG. 4A, the collaboration session host 402 is positioned at a center of virtual collaboration layout 400. The relative position of the collaboration session host 402 to other collaboration session participants in the virtual collaboration layout 400 represents how much the collaboration session host 402 can hear audio associated with side conversations between collaboration session participants. FIG. 4A shows that the collaboration session host 402 is positioned within the virtual collaboration layout 400 so as to be able to listen to participants of the collaboration session at a most equal volume.

Figure 4B:
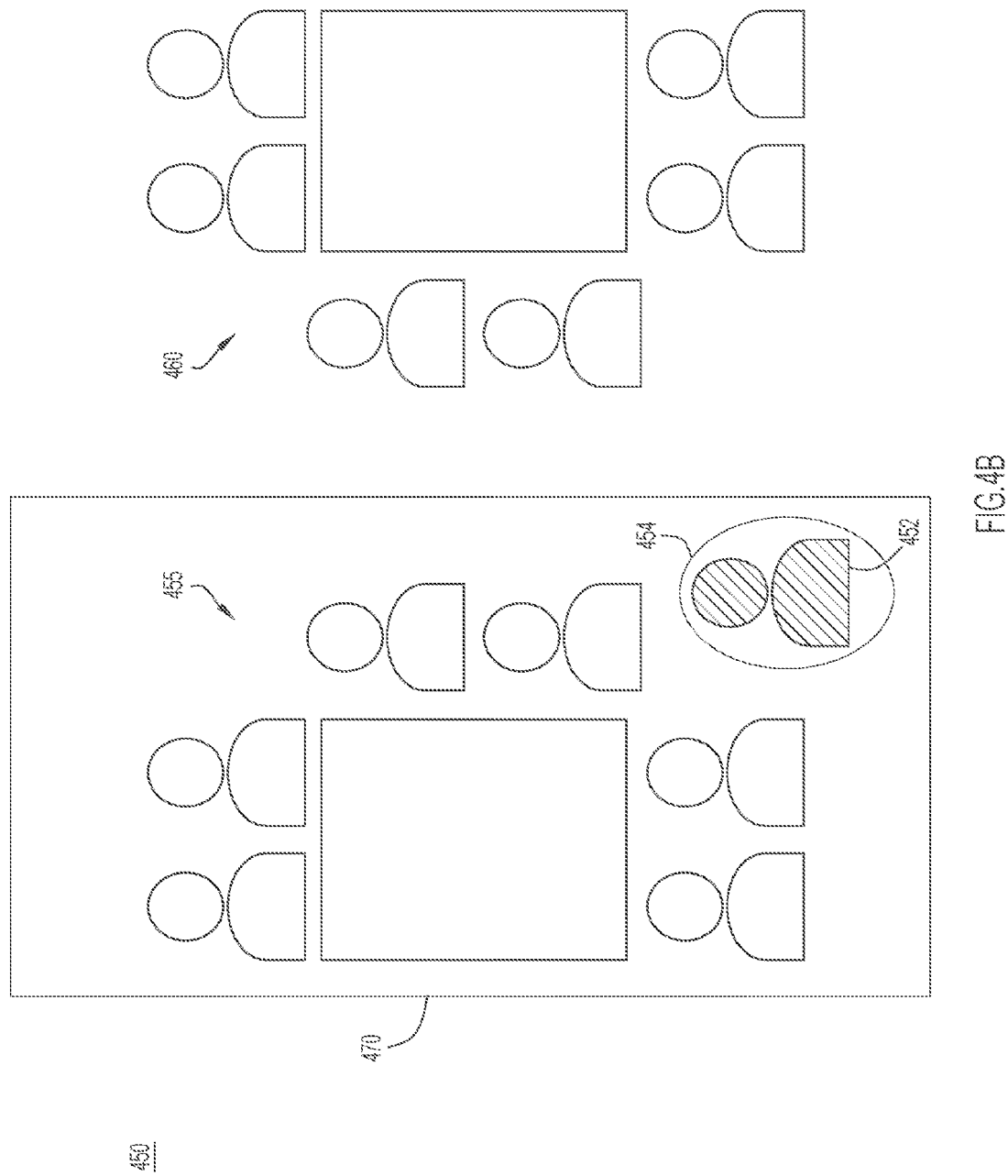
FIG. 4B illustrates a second virtual position of a collaboration session host relative to other collaboration session participants according to an example embodiment.

FIG. 4B illustrates a virtual collaboration layout 450 with a host 452 in a second virtual position 454 relative to other collaboration session participants, according to an example embodiment. In the example of FIG. 4B, the host is positioned closer to a first group 455 than to a second group 460. In some embodiments, based on a proximity of the host 452 to the first group 455, the host 452 is automatically added to the first group 455, shown by enclosing the first group 455 and the host 452 within a boundary 470. In the second virtual position 454 of FIG. 4B, the host 452 is provided with an audio signal from participants in the first group 455 at a volume that is higher than a second volume of a second audio signal generated by the second group 460.

Figure 5:
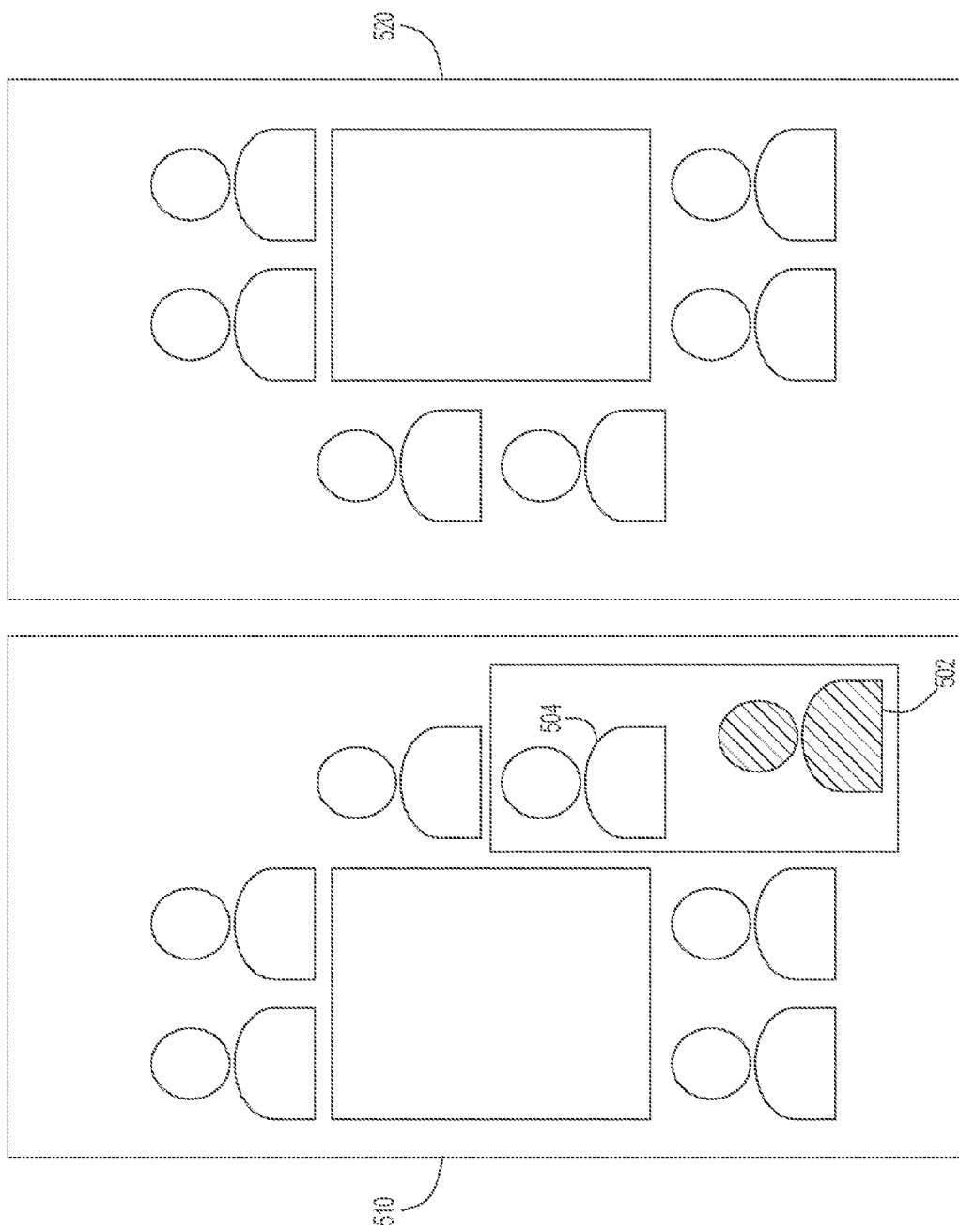
FIG. 5 illustrates a host engaging in a one-on-one conversation with a collaboration session participant in accordance with an example embodiment.

FIG. 5 illustrates a virtual collaboration layout 500 that includes a host 502 engaging in a one-on-one conversation with a collaboration session participant 504 in accordance with an example embodiment. The virtual collaboration layout 500 includes some participants assigned to in a first group 510 and other participants assigned to a second group 520. In the illustrated embodiment, the host 502 is provided with an audio input channel generated by the collaboration session participant 504 at a first volume that is higher than audio provided by other members of the first group 510 at a second volume. In some embodiments, the host 502 is provided with audio of the second group 520 at a third volume that is lower than the second volume. Generally, audio generated by the host 502 and the session participant 504 during the one-on-one conversation is not provided to other members of the first group 510 or to the second group 520.

Figure 6:
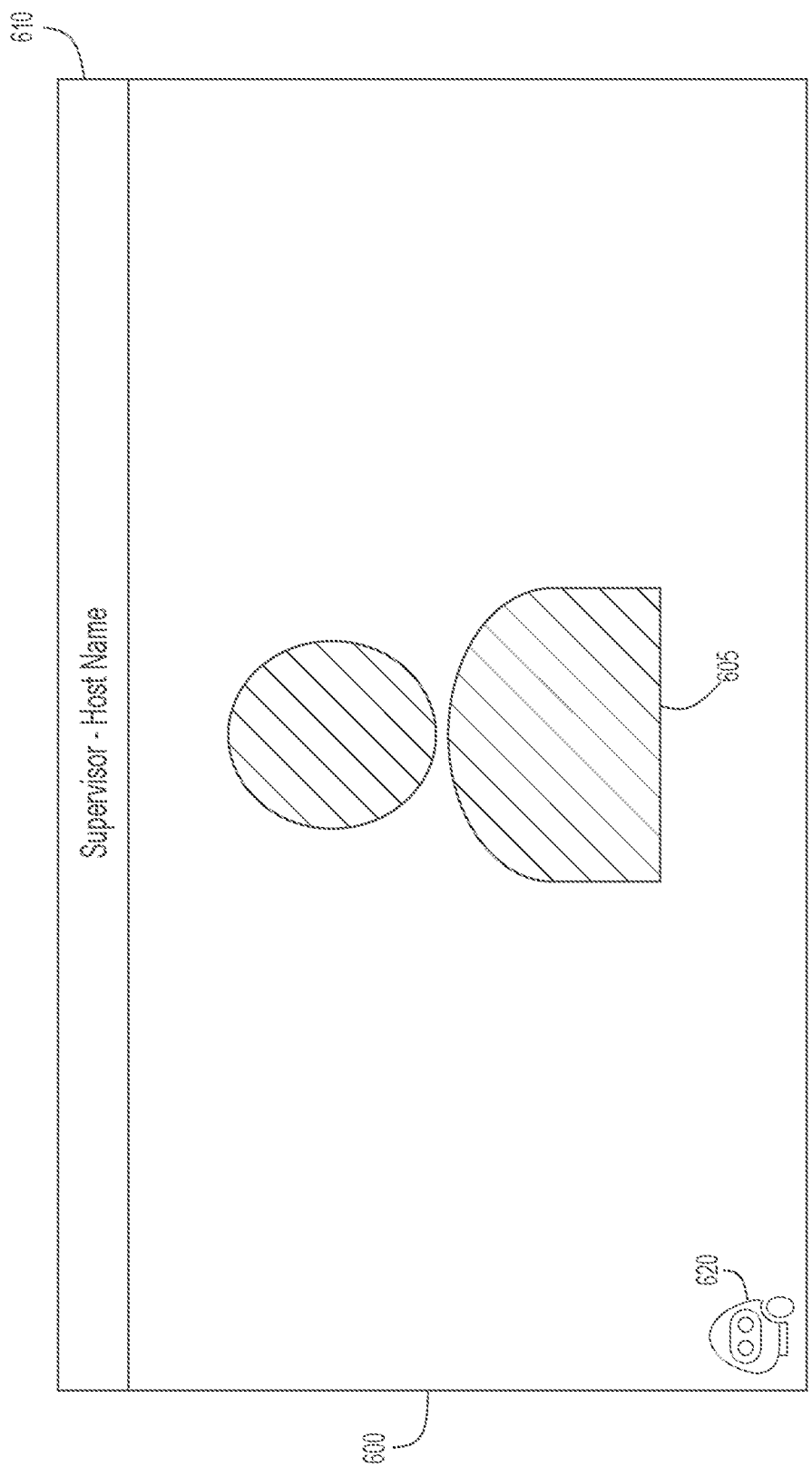
FIG. 6 illustrates an example user interface screen that displays a host of a primary collaboration session in accordance with an example embodiment.

FIG. 6 illustrates an example user interface screen that displays a host of a primary collaboration session (as presented to all participants in a collaboration session) in accordance with an example embodiment. The user interface screen 600 shows a video display of a collaboration session host 605. The collaboration session host 605 is indicated by a special banner 610. Other embodiments communicate that the user interface includes an image of a collaboration session host via another user interface method (e.g., special border or other means). The special host designation allows other collaboration session participants to recognize the host and that the host is present in the collaboration session. In some embodiments, the host is provided with a user interface control that allows the host to toggle the video feed provided to a collaboration session between a live video, such as that illustrated in FIG. 6, and a static image such an avatar. In some embodiments, the host can select to display a virtual host assistant in their video feed. A participant in the collaboration session is then able to query the virtual host assistant for assistance with some questions they might commonly encounter. FIG. 6 illustrates an example of a virtual assistant bot icon 620 that is presented to a participant of a collaboration session, in accordance with an example embodiment.

Figure 7:
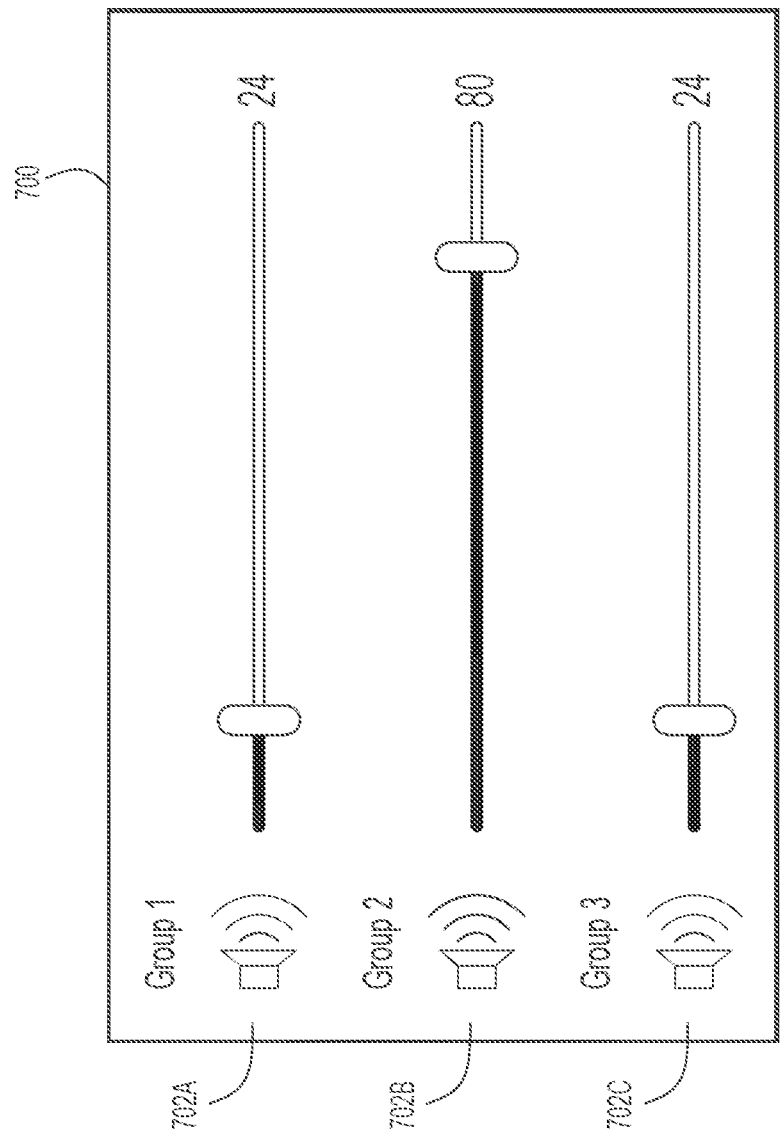
FIG. 7 shows an example of a volume control user interface provided to a host of a collaboration session in accordance with an example embodiment.

FIG. 7 shows an example of a volume control user interface 700 provided to a host of a primary collaboration session in accordance with an example embodiment. FIG. 7 shows that the volume control user interface 700 includes a plurality of volume controls, identified as volume control 702A, volume control 702B, and volume control 702C. Each of the volume controls 702A-C provides for adjustment of a volume of a respective group of participants (or side conversation) within an audio stream provided to a host. Alternatively, the volume of each group is controllable based on a location of a host icon or avatar, as discussed above with respect to FIGS. 3-6.

Figure 8:
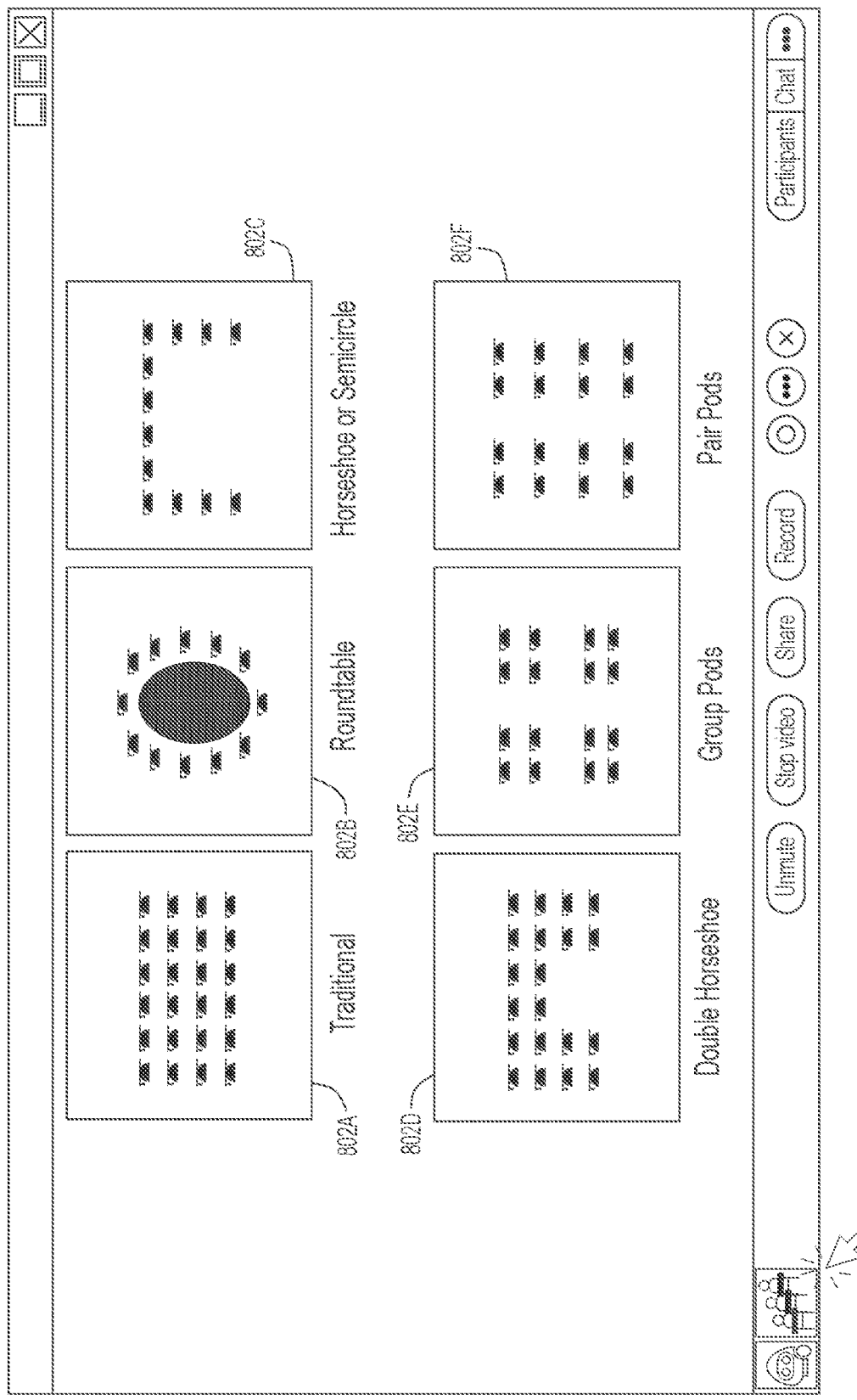
FIG. 8 illustrates a user interface providing for the selection of a preconfigured virtual seating chart in accordance with an example embodiment.

FIG. 8 illustrates a user interface providing for a selection of a preconfigured virtual seating chart in accordance with an example embodiment. The user interface 800 of FIG. 8 displays six different preconfigured seating charts, identified as seating chart 802A, seating chart 802B, seating chart 802C, seating chart 802D, seating chart 802E, and seating chart 802F. Some embodiments provide for the selection, by a host, of one of the preconfigured seating charts. The selected seating chart then forms a basis for defining a virtual collaboration layout of participants of a primary collaboration session. In some embodiments, a host assigns participants to particular positions within the selected seating chart. In some of these embodiments, the assignment is made by dragging participants from a participant palette to a position within the selected seating chart. In some embodiments, a host selects that participants be assigned seats in a random order, or based on a number of participants and/or grouping preferences associated with each of the participants.

Figure 9:
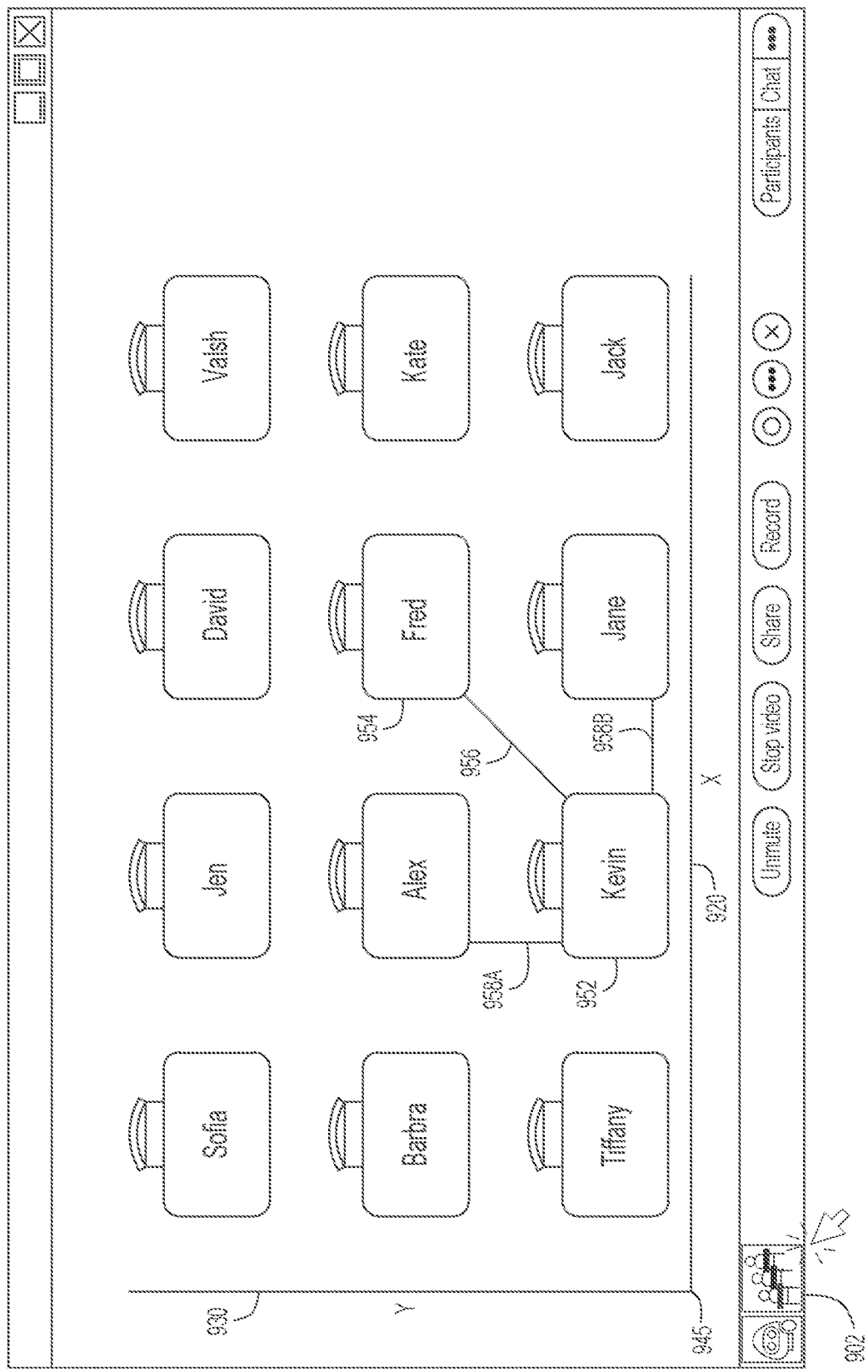
FIG. 9 illustrates an example user interface that communicates virtual seat assignments of collaboration session participants according to an example embodiment.

FIG. 9 illustrates an example user interface that communicates virtual seat assignments of collaboration session participants. The user interface 900 of FIG. 9 overlays a name of each participant at their respective virtual seat assignment within a virtual collaboration layout selected for the collaboration session. Thus, in some embodiments, a different name is associated with each of the plurality of icons (unless two participants have exactly the same name). FIG. 9 also shows a group view icon 902 that may be selected by a host to invoke the functionality described in connection with FIG. 9.

In some embodiments, participants are assigned positions within a selected seating chart in an order in which the participants join the collaboration session, or in an alphabetical order defined by the participant's first or last name. In some embodiments, upon joining a collaboration session, a collaboration server prompts the participant to select a seating location within the selected seating chart.

In at least some embodiments, a host is provided with user interface controls that allow for modification of the virtual seating chart during a collaboration session by returning to the session view icon. For example, in some environments, a host is provided with controls that allow for a swap/switch/move of a first participant from one location to another to limit any side conversations the first participant is having with a second participant that is proximate to, within the virtual collaboration layout, the first participant. In some embodiments, a drag and drop interface is provided that allows the host to drag a particular participant from an existing location within the virtual collaboration layout and drop the participant at another position in the virtual collaboration layout. In some embodiments, a collaboration server automatically swaps names of the participants when a change in seating assignment has been so indicated. Some of these embodiments also notify the involved participants of the change.

FIG. 9 shows an x-axis 920, y-axis 930, and an origin 945. While the x axis 920, y axis 930, and origin 945 are visible in FIG. 9, these would generally not be visible in a user interface displayed by the disclosed embodiments but are provided for purposes of the description of FIG. 9. In some embodiments, a virtual position of each participant within a virtual collaboration layout is defined with respect to a coordinate system, such as that provided by the x-axis 920, y-axis 930, and origin 945. For example, a first position of a first icon 952 might be represented via coordinates (5,5) relative to the x axis 920 and y axis 930, a second position of a second icon 954 might be represented via coordinates (10, 10) relative to the x axis 920 and y axis 930. A distance 956 between the first position and second position is then determined, in some embodiments, to determine whether a side conversation between a participant represented by the first icon 952 (e.g., "Kevin") is permitted to participate in a side conversation with a second participant represented by the second icon 954 (e.g., "Fred"). In other embodiments, a distance 958A along the x-axis is determined, as well as a distance 958B along the y-axis. Each of these distances is compared to a separate threshold. If each of the distances are below their respective threshold, Kevin and Fred are permitted to engage with each other in a side conversation.

Figure 10:
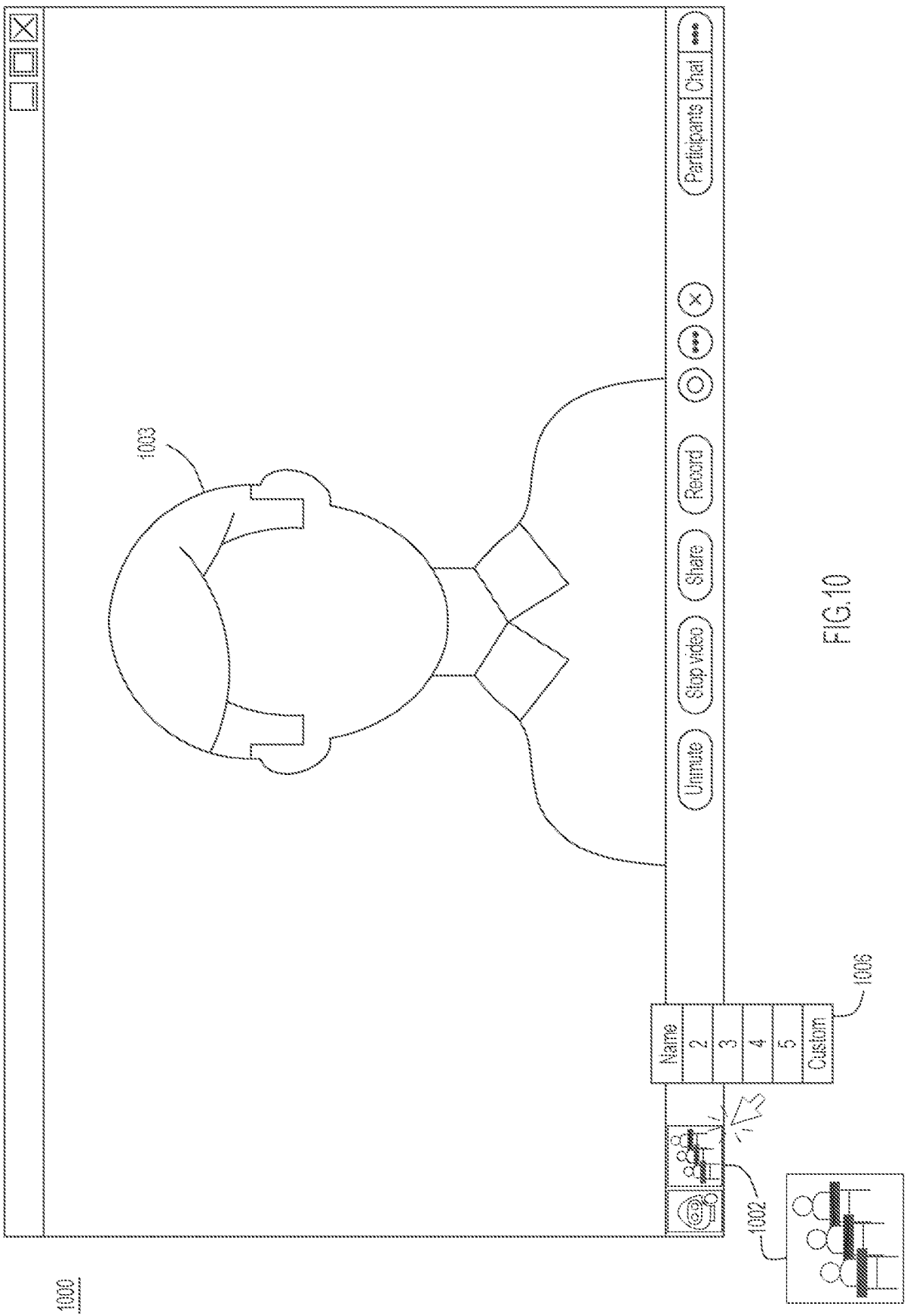
FIG. 10 illustrates a session view in accordance with an example embodiment.

FIG. 10 illustrates a session user interface in accordance with an example embodiment. The session user interface 1000 of FIG. 10 is provided, in some embodiments, via selection, by a host, of a session view icon 1002, also shown in an expanded view. When a host 1003 selects the session view icon 1002 (or "desk icon"), participant video displays are modified, as necessary, to show a video image from a designated camera device, typically associated with a host's client/user device. This is also referred to "classroom view" operation.

From a drop-down menu 1006, a host can select "None" for no pairing, 2/3/4/5 pairing, or custom for other combinations of seating arrangements. In a custom mode, a host uploads, in some embodiments, a seating chart or identifies one of a plurality of pre-configured seating charts to complete their configuration. If the host selects 2, 3, 4, or 5 as their option, the collaboration server randomizes, in some embodiments, participant pairings based on a number of active participants. The host can then make additional edits (e.g., swapping one participant for another) before completing their virtual collaboration layout. If "none" is selected, the collaboration server will utilize default or standard settings.

In some embodiments, within a "collaboration view," provided to a host, the host is able to configure the virtual collaboration layout in one of two ways: 1) manual configuration or 2) automated configuration. To enable the feature, a host may click on the session view icon 1002, as described above.

Figure 11:
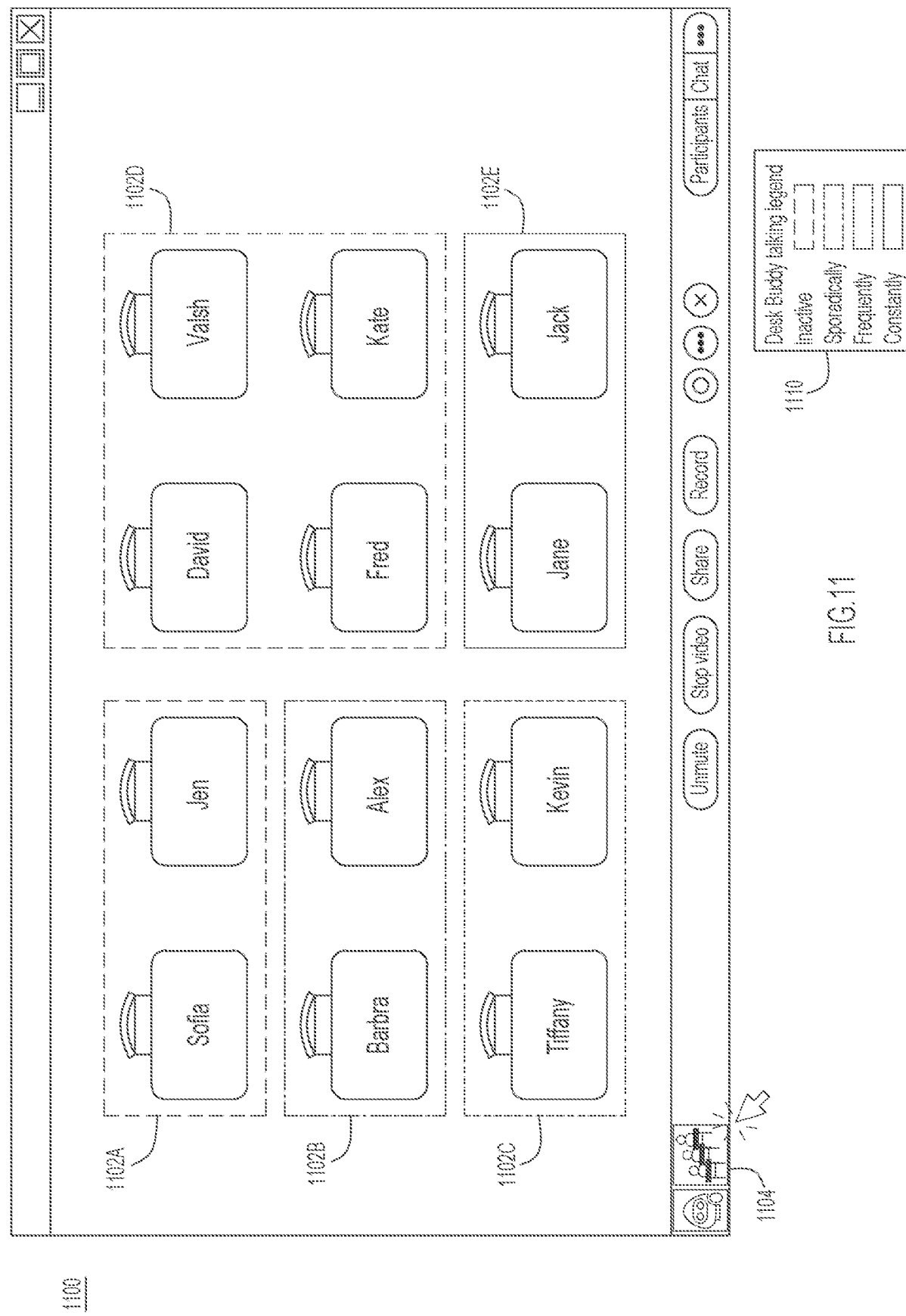
FIG. 11 illustrates an example user interface displaying existing whisper mode collaboration sessions within a primary collaboration session in accordance with an example embodiment.

FIG. 11 illustrates a user interface 1100 configured to display side conversations within a primary collaboration session in accordance with an example embodiment. The user interface 1100 includes visual cues, shown as bounding boxes surrounding participants in each of five different side conversations or groups, labeled as group 1102A, group 1102B, group 1102C, group 1102D, and group 1102E. In some embodiments, the bounding boxes are displayed using a first line type (e.g., dotted lines) around inactive groups and a second line type (e.g., solid lines) around active groups to designate a level of activity within side conversations or "whisper mode" collaboration sessions. These designations allow a host to determine a level at which each side conversation is facilitating interaction between its respective participants (e.g., levels of "too much," "moderately," "infrequently," or "not at all"). Some embodiments involve drawing each bounding box using different colors based on the level of activity (e.g., a group with constant activity is designated using a first color (e.g., a red line), a group with frequent activity is designated using a second color (e.g., a blue line), a group with sporadic activity is designated via a third color (e.g., a green line), or an inactive group is designed using a fourth color or alternative line type (e.g., a dashed line).

In some embodiments, a group view icon 1104 is presented and configured to allow a host to monitor activity within any of the groups 1102A-E. In some embodiments, the group view icon 1104 and the group view icon 902 (FIG. 9) are displayed in a common position within a user interface.

In some embodiments, a host can use the session view icon 1002 discussed above with respect to FIG. 10 or the group view icon 1104 shown in FIG. 11 to monitor which participants are engaged in side conversations and which participants are inactive within a side conversation. After a host has configured a virtual seating chart, they can monitor any side conversations via the same group view icon, at least in some embodiments. In this view, the host is presented with visual cues (solid versus dotted lines) as to which participants are having side conversations and how frequently they are doing so (e.g., via color coding of bounding boxes, green, blue, red). FIG. 11 shows a legend 1110 to illustrate the meaning of the color-coded bounding boxes.

Figure 12:
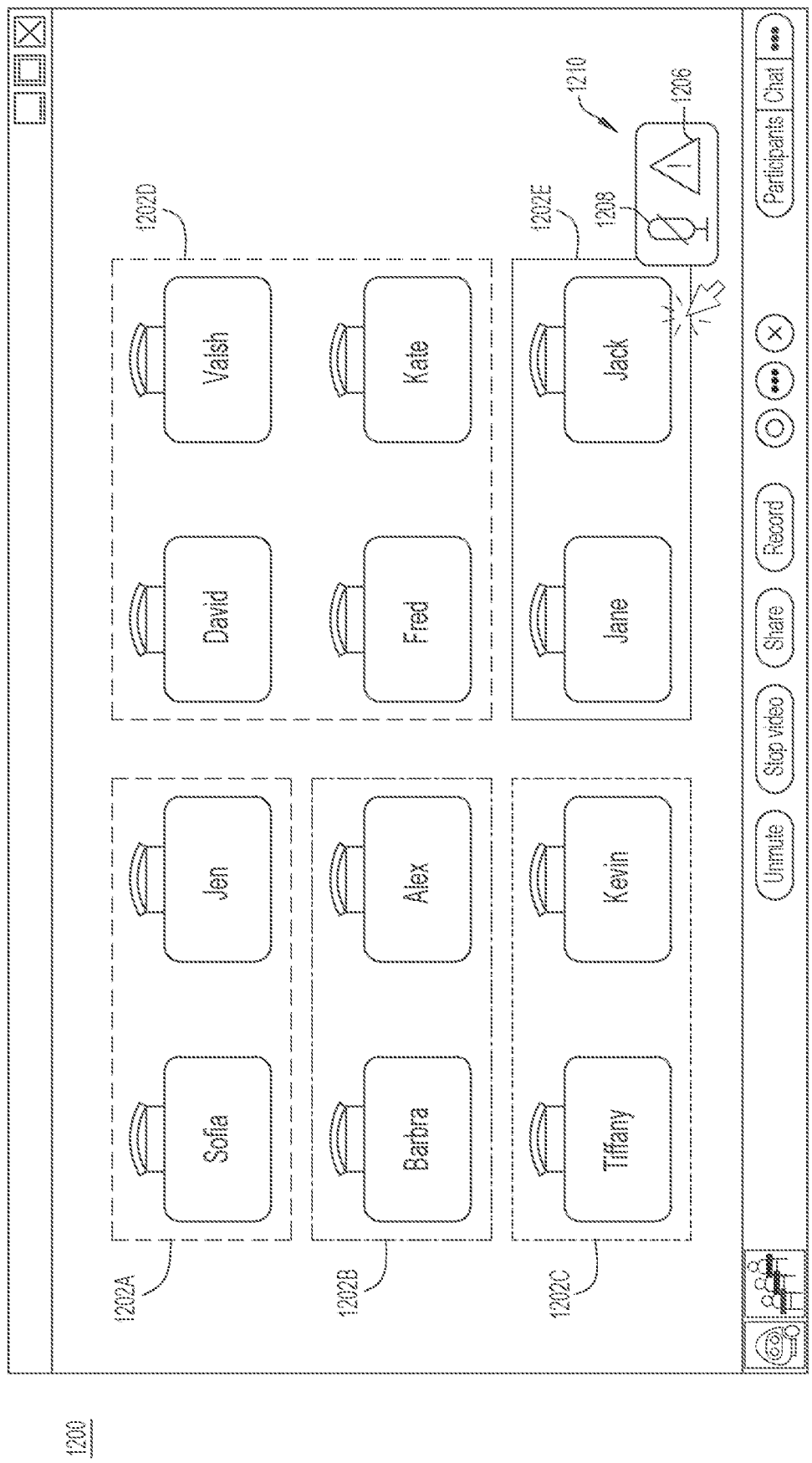
FIG. 12 illustrates an example collaboration session management user interface in accordance with an example embodiment.

FIG. 12 illustrates an example collaboration session management user interface in accordance with an example embodiment. The user interface 1200 facilitates issuance of a warning to participants within a side conversation. Alternatively, the user interface 1200 is configured to also provide for a host to mute the side conversation. As an example, the user interface 1200 of FIG. 12 displays five groups or side conversations, shown as group 1202A, group 1202B, group 1202C, group 1202D, and group 1202E. In some embodiments, the user interface 1200 is configured to detect when a hover operation is performed (e.g., via a pointing device) over a group. In response to the hover and/or a right click of the pointing device, a pop-up menu 1206 is displayed. To issue a warning to a group of participants, a host can hover over the group and select one of the following actions from the pop-up menu 1206: a first action 1208 (e.g., a red microphone) to mute the participants or a second action 1210 (e.g., a yellow triangle with a "!" symbol) to provide the participants a warning. Note that the red microphone and yellow triangle graphical representations of FIG. 12 are simply examples and other embodiments utilize other graphical representations and/or text to communicate control actions. Some embodiments of the user interface 1200 provide for a multi-select operation on a plurality of the groups 1202A-E, and selection of the mute control (e.g., first action 1208) causes the selected groups to be collectively muted.

Figure 13A:
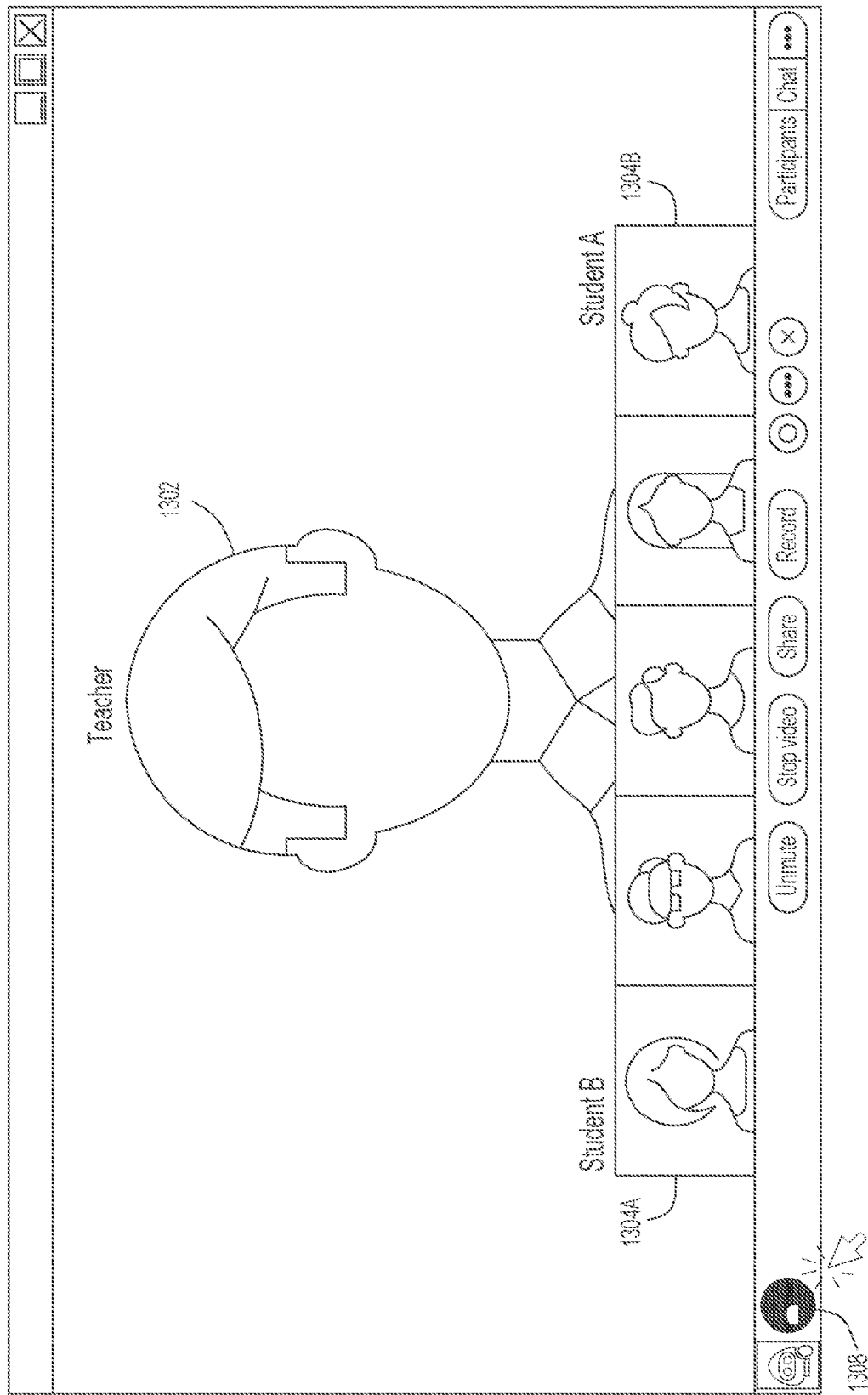
FIG. 13A illustrates a user interface displayed within a collaboration session of a participant before the participant engages in a "whisper mode" conversation, according to an example embodiment.

FIG. 13A illustrates a user interface 1300 displayed within a collaboration session of a participant before the participant engages in a "whisper mode" conversation, according to an example embodiment. In a collaboration session view or classroom view, the user interface 1300 displays a relatively larger view of the host 1302, and smaller video feeds of participants in the collaboration session, including a first participant video 1304A and a second participant video 1304B.

In some embodiments, to initiate a side conversation with the second participant, the first participant selects, in some embodiments, an icon 1308 designated for such a purpose (e.g., a "buddy" icon), which is located, in some embodiments, to the right of a virtual assistant bot icon, such as the virtual assistant bot icon 620 of FIG. 6. In some embodiments, this action will automatically open up a "desk buddy" view for participants included in the side conversation. This will also provide a second concurrent, side conversation between these participants.

FIG. 13B illustrates a user interface 1330 presented to a participant participating in a side conversation in accordance with an example embodiment. The user interface 1330 of FIG. 13B is displayed to a participant, with an image of the participant displayed at a lower left of the user interface, at least in some embodiments. Thus, the user interface 1330 of FIG. 13B is displayed to the first participant 1332A, who is participating in a side conversation with the second participant 1332B. In some embodiments, this "self-view" is overlaid on, and/or below a primary video 1340 (e.g., an active speaker of the primary collaboration session or video of a host of the primary collaboration session) while the other participants (e.g., the second participant 1332B) in the side conversation are displayed, in some embodiments along the lower right (and also overlaid on the primary video 1340) as shown.

In some embodiments, a translucent tunnel graphical element 1335 is displayed to provide a visual cue for the side conversation between the first participant 1332A and second participant 1332B. The translucent tunnel graphical element 1335 has a first endpoint at a video display of the first participant 1332A in the side conversation, and a second endpoint at a video display of the second participant 1332B in the side conversation. Initiating or maintaining the side conversation, in some embodiments, mutes audio generated by the side conversation participants with respect to other participants in the primary collaboration session that are not included in the side conversation. Thus, in at least some embodiments, audio generated by the side conversation is not provided to the primary collaboration session. This allows the participants in the side conversation to communicate with each other without distracting from the primary collaboration session. In some embodiments, participants in the side conversation still receive at least a portion of audio and/or video from the primary collaboration session. In some embodiments, audio and/or video from the primary collaboration session is delivered to the participants in the side conversation in an unaltered manner (e.g. in a manner equivalent to how it would be delivered if the participants were not included in the side conversation). Some embodiments provide participants in a side conversation with a user interface that allows them to control a level of audio generated by the primary collaboration session.

In some embodiments, in the "side conversation view" or "desk buddy view" of user interface 1330, other participant videos disappear and only the video streams of side conversation participants are visible. Side conversation participants generally see equivalent views, except that the position of each side conversation participant changes depending on which participant is viewing a display. For example, a side conversation participant is shown a video image of themselves on the left most position, in some embodiments. Thus, as discussed above, the user interface 1330 represents a view provided to the first participant 1332A in some embodiments.

Figure 13C:
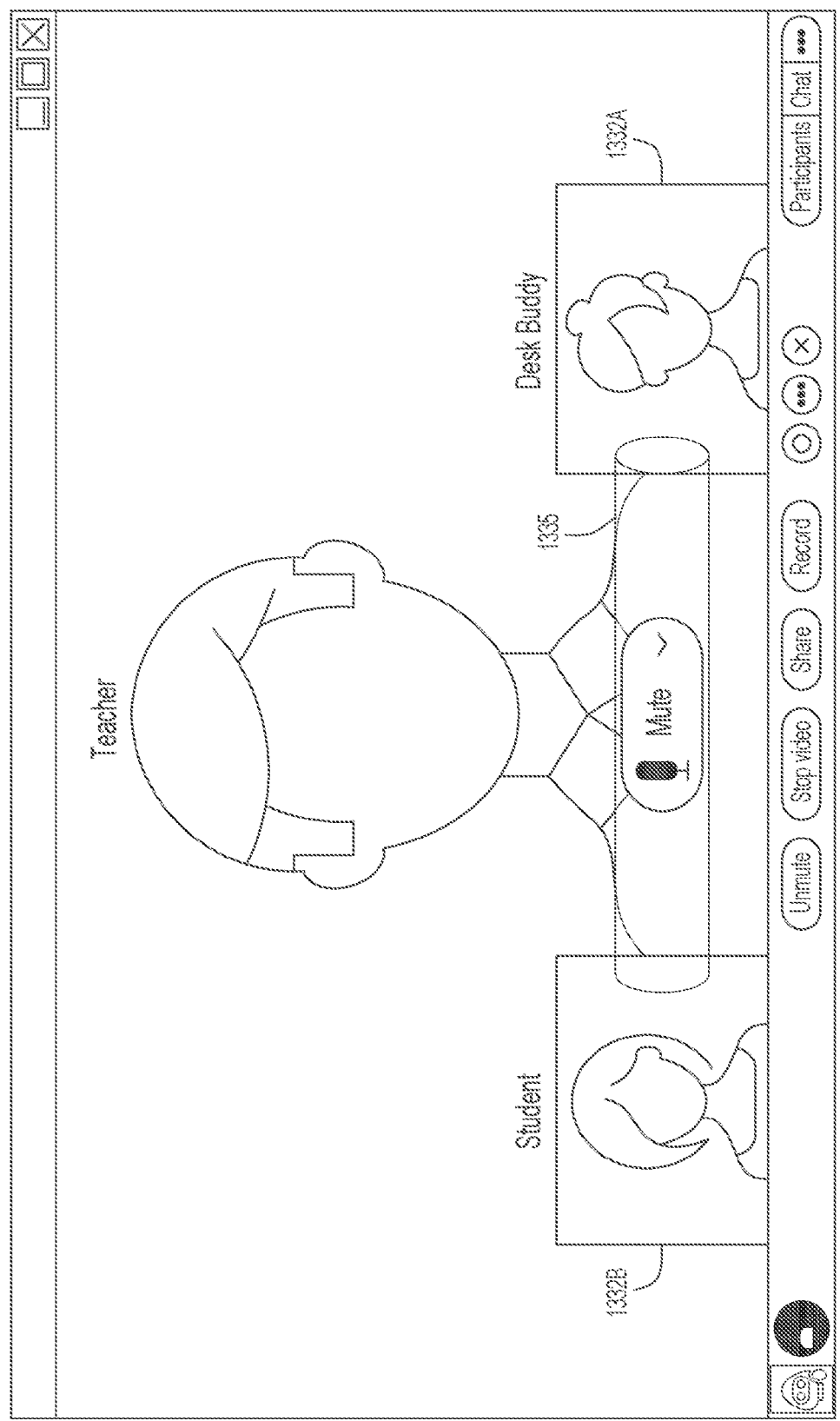
FIG. 13C illustrates an alternate view from a second participant's perspective, which shows positions of a first participant and a second participant flipped relative to that shown in FIG. 13B, according to an example embodiment.

FIG. 13C illustrates a user interface 1350 that is provided to the second participant 1332B in accordance with an example embodiment. In the user interface 1350, the positions of the first participant 1332A and the second participant 1332B are flipped relative to FIG. 13B, since a display provided to a participant shows a video of the participant in a particular position of the display, at least in some embodiments. Thus, in these embodiments, an organization of a display provided to each participant is different.

Figure 14A:
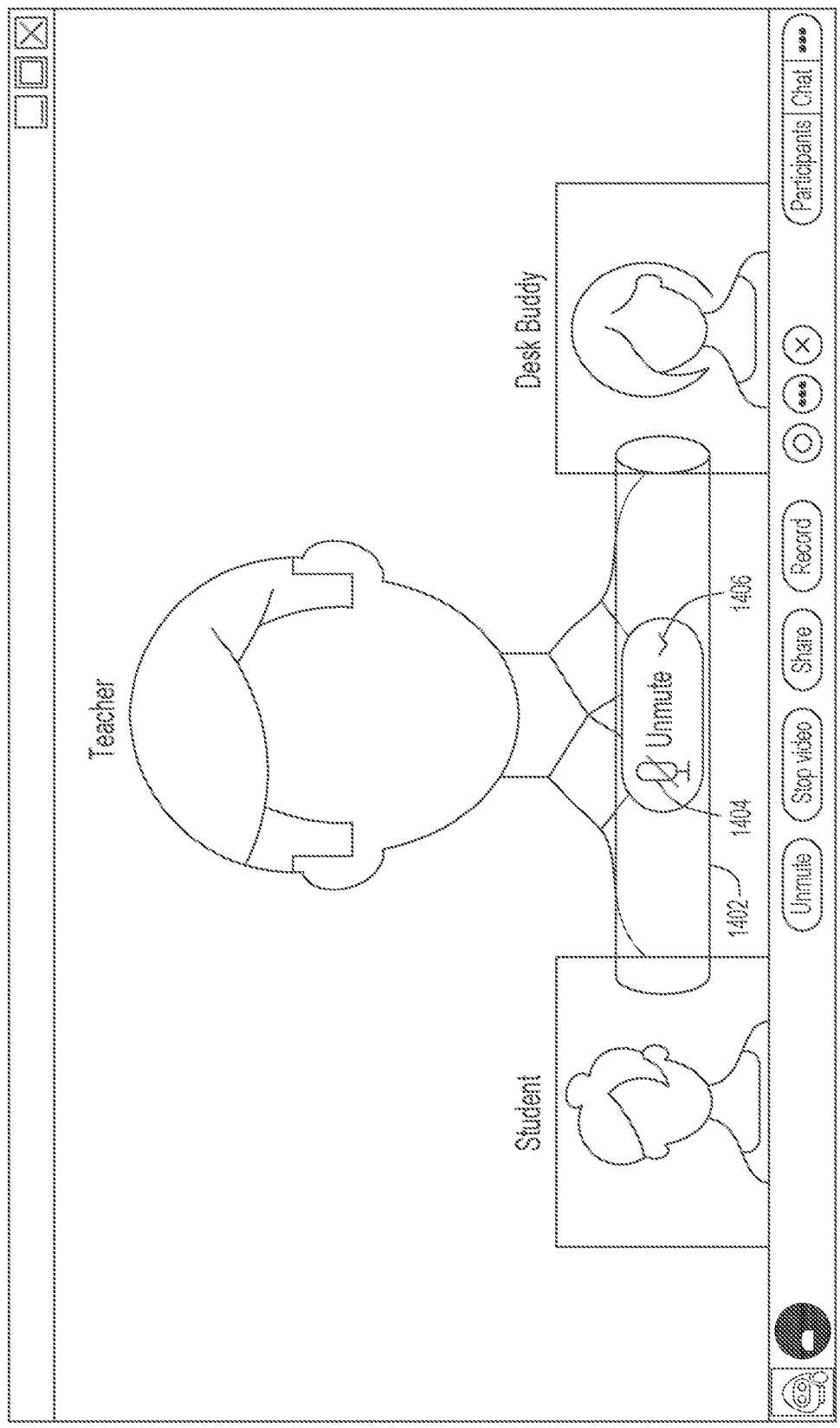
FIG. 14A shows a user interface displayed to side conversation participants in accordance with an example embodiment.

FIG. 14A shows a user interface 1400 displayed to side conversation participants in accordance with an example embodiment. The user interface 1400 illustrates display of a state of a side conversation. When in the "side conversation" view or "desk buddy" view, a participant can initiate any of the following actions:

1) Engage in the side conversation by leaving the side conversation channel open: this state is communicated, in some embodiments, by displaying a tunnel graphical element 1402 in a predefined color (e.g., green). In some embodiments, the communication of the state is provided via an icon or text, such as icon 1404, which represents an open microphone when the side conversation is in an open state. In some embodiments, both a first color of the tunnel graphical element 1402 and a particular type of icon 1404 communicate the state of the side conversation.

2) Disengage temporarily from the conversation by clicking on a mute control 1406 (e.g., a button). Selecting the mute control 1406 results in muting the audio of the side conversation and in some embodiments, the muted side conversation is visually indicated by changing a color of the tunnel graphical element 1402 from a first predefined color to a second predefined color (e.g., red). The icon 1404 also changes in some embodiments, from, for example, an icon representing an open microphone to an icon representing a closed microphone as shown in FIG. 14A.

Figure 14B:
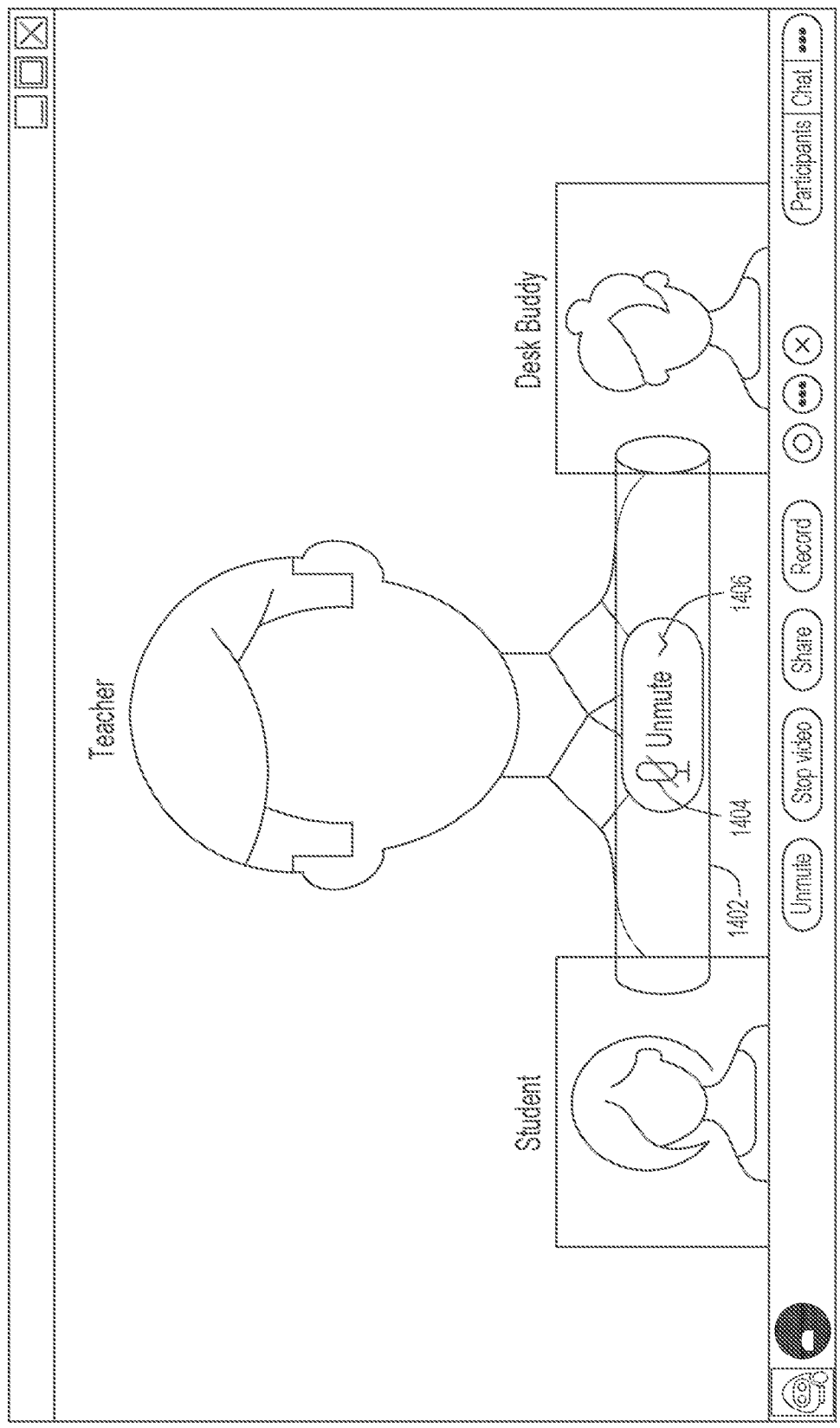
FIG. 14B shows a user interface from a perspective of the second participant perspective when the side conversation of FIG. 14A is in the muted state, in accordance with an example embodiment.

FIG. 14B shows a user interface 1450 from the second participant's perspective when the side conversation of FIG. 14A is in the muted state.

Figure 15A:
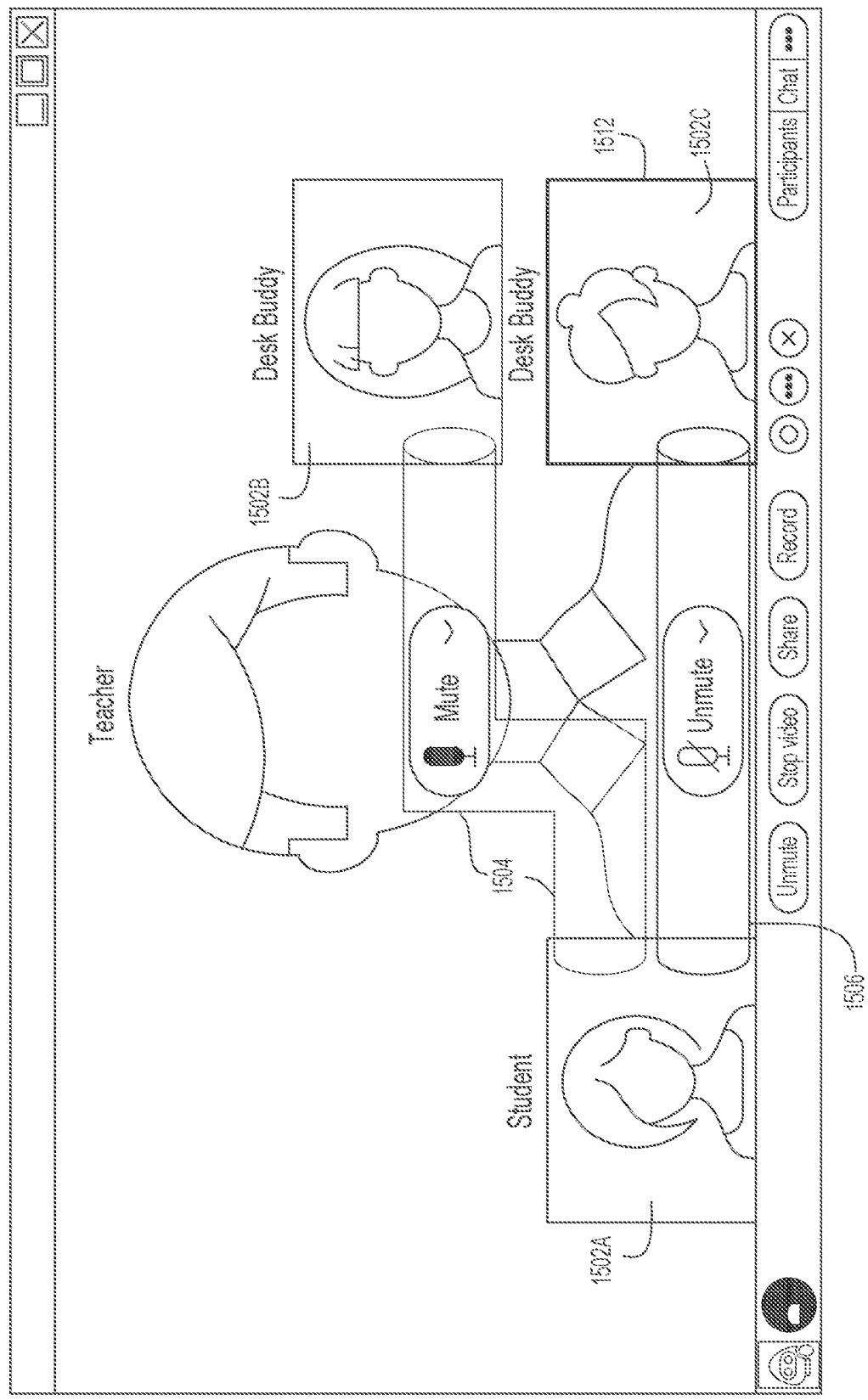
FIG. 15A illustrates a user interface provided to a side conversation participant in which there are multiple other side conversation participants, in accordance with an example embodiment.

FIG. 15A illustrates a user interface 1500 provided to a side conversation participant in which there are at least two other side conversation participants, in accordance with an example embodiment. The user interface 1500 of FIG. 15A illustrates an ability of each side conversation participant to control each audio channel with each other side conversation participant. Thus, for example, the first participant 1502A has an open first audio channel with a second participant 1502B, visually indicated via a first tunnel graphical element 1504. The open state of the first audio channel is visually communicated, in some embodiments, via a first predefined color (e.g., green) of the first tunnel graphical element 1504. The first participant 1502A has a second audio channel with a third participant 1502C, that is muted. The muted second audio channel is visually represented by a second tunnel graphical element 1506. As the second audio channel with the third participant 1502C is muted, in some embodiments, the second tunnel graphical element 1506 representing the second audio channel is displayed in a second predefined color that is different (e.g., red) from the first tunnel graphical element 1504 that represents the first audio channel. In the embodiment of FIG. 15A, the third participant 1502C is shown with an outline 1512 indicating that the second audio channel between the first participant 1502A and the third participant 1502C is muted. The outline 1512 is displayed in a predefined color indicating that the second audio channel is muted (e.g., red).

Figure 15B:
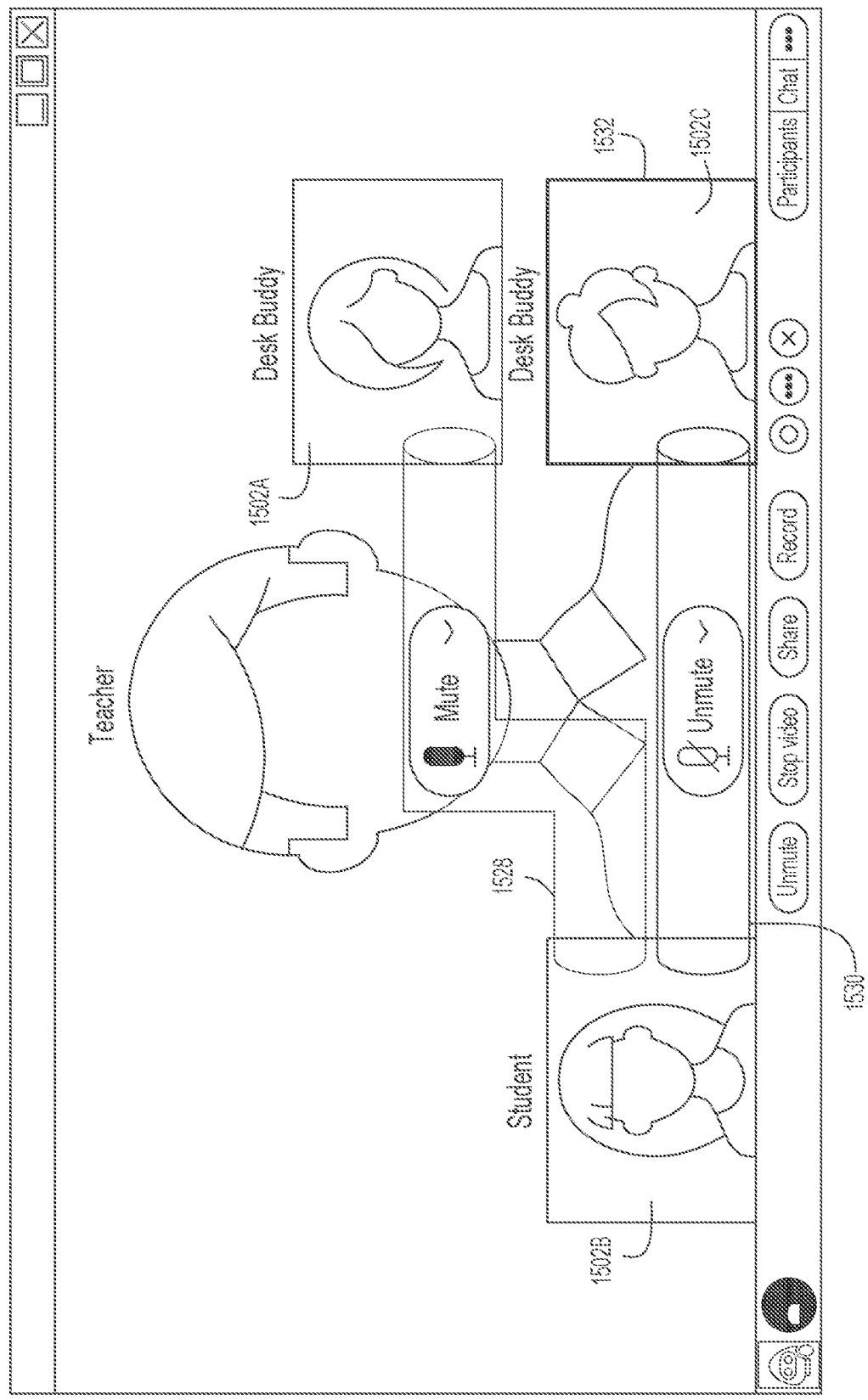
FIG. 15B shows a user interface of the second participant for the scenario depicted in FIG. 15A in accordance with an example embodiment.

FIG. 15B shows a user interface 1525 showing the second participant 1502B of FIG. 15A. The user interface 1525 displays a third tunnel graphical element 1528 representing the first audio channel of FIG. 15A between the first participant 1502A and the second participant 1502B. Since the first audio channel is open, the third tunnel graphical element 1528 is shown in a predefined color that represents the open channel state of the first audio channel (e.g., green), at least in some embodiments. A fourth tunnel graphical element 1530 is shown representing a third audio channel between the second participant 1502B and the third participant 1502C. Since the third audio channel is muted, the fourth tunnel graphical element 1530 is shown, in some embodiments, in a predefined color that represents the muted state of the third audio channel (e.g., red). The third participant 1502C is also displayed with an outline 1532 represented the muted state with respect to the second participant 1502B.

Figure 15C:
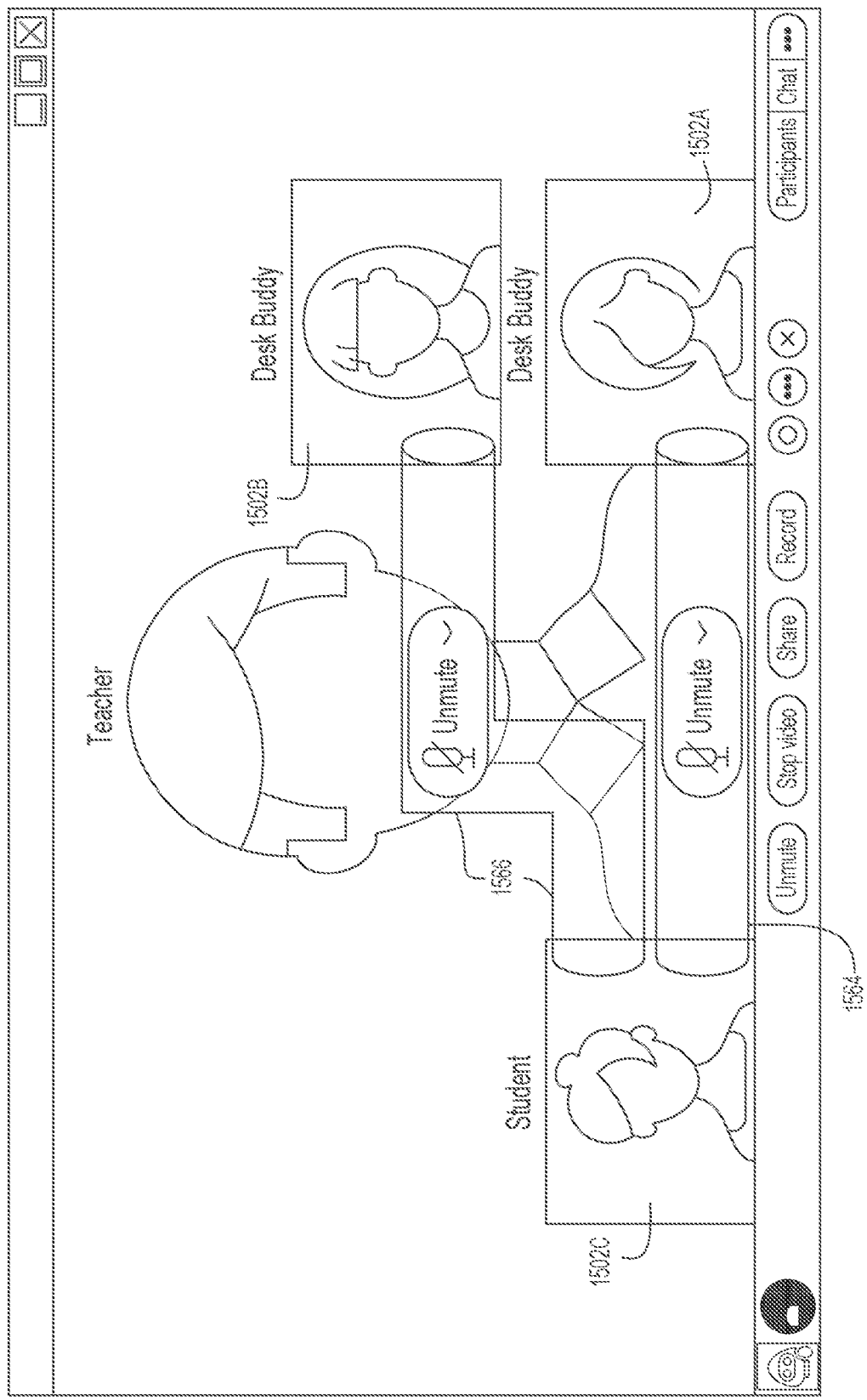
FIG. 15C shows a view of the third participant for the scenario depicted in FIGS. 15A and 15B in accordance with an example embodiment.

FIG. 15C shows a user interface 1560 of the third participant 1502C of FIG. 15A and FIG. 15B. The user interface 1560 shows a fifth tunnel graphical element 1564 representing the second audio channel between the first participant 1502A and the third participant 1502C. Since the second audio channel is muted, the fifth tunnel graphical element 1564 is displayed, in at least some embodiments, in a predefined color representing the muted state of the second audio channel. The user interface 1560 also displays a sixth tunnel graphical element 1566, representing the third audio channel between the second participant 1502B and the third participant 1502C. The sixth tunnel graphical element 1566 is also displayed in a predefined color represented a muted status (e.g., red), in at least some embodiments.

Figure 16A:
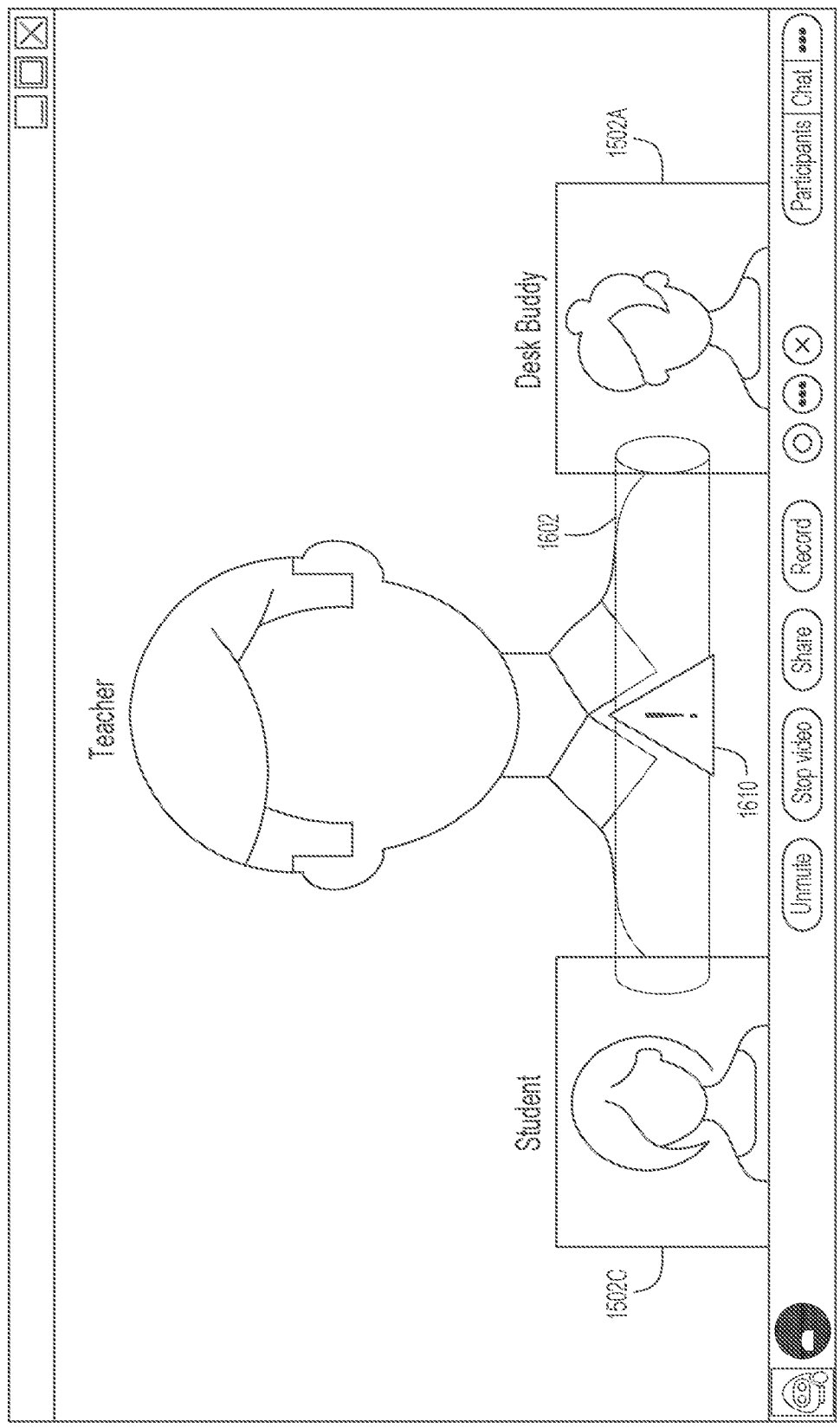
FIG. 16A illustrates a user interface that displays a warning indication to a side conversation participant in accordance with an example embodiment.

FIG. 16A illustrates a user interface 1600 that displays a warning indication to a side conversation participant in accordance with an example embodiment. The user interface 1600 displays a tunnel graphical element 1602 representing an audio channel between the first participant 1502A and the third participant 1502C referenced above in the discussion of FIGS. 15A - 15C. Some embodiments involve providing a host of a collaboration session with an ability to issue a warning to participants of a side conservation. As shown in the user interface 1600, a warning icon 1610 is displayed in the user interface 1600 upon a command issued by the host. The warning icon 1610 is shown on a display provided to the third participant 1502C, but would also, in some embodiments, be displayed to other members of the side conversation, such as the first participant 1502A. In some embodiments, the warning icon 1610 is a yellow triangle with a "!" character overlaid on top of the yellow triangle, but in other embodiments other warning icons are used.

Figure 16B:
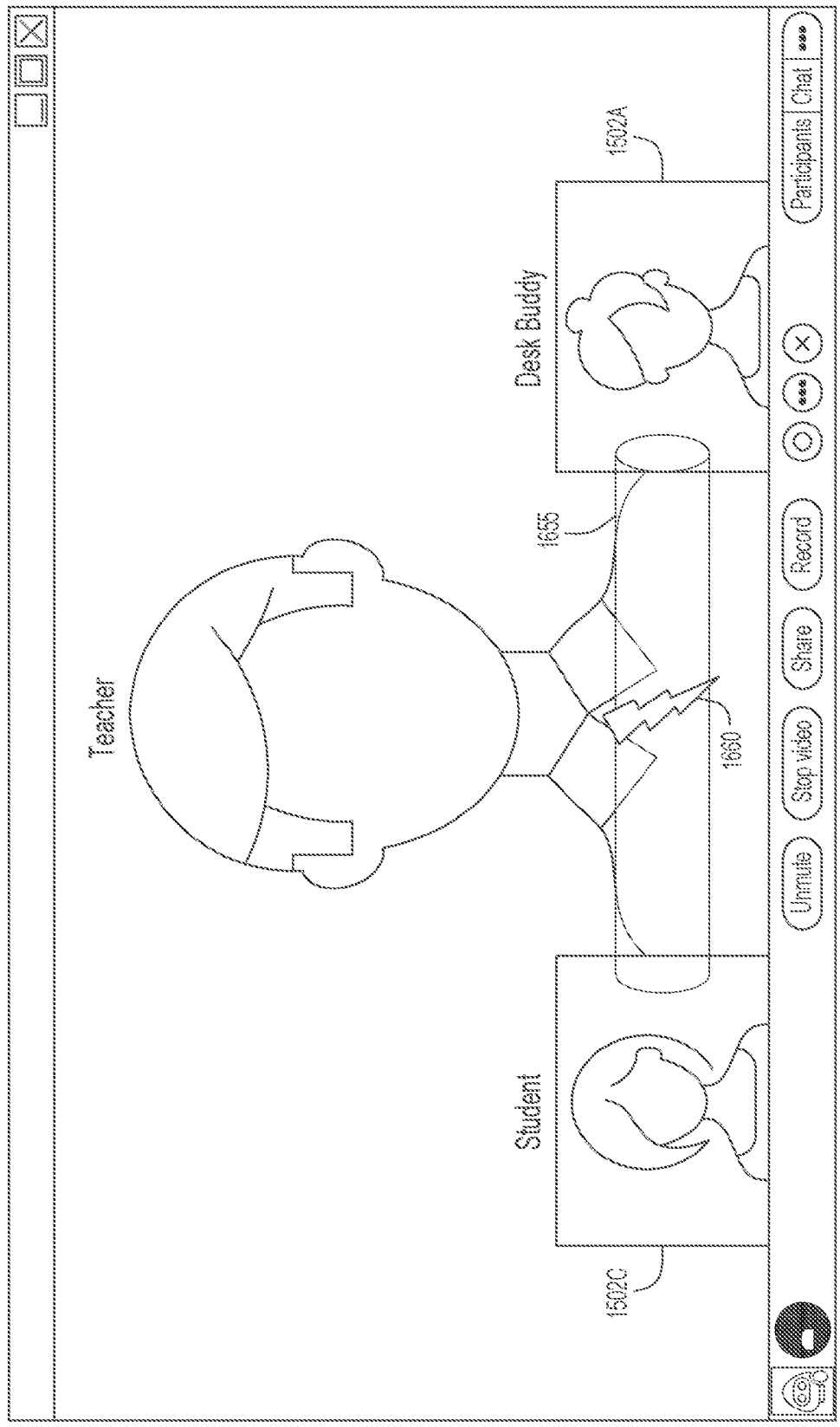
FIG. 16B illustrates a user interface indicating that, according to an example embodiment, a side conversation between two participants has been disabled.

FIG. 16B illustrates a user interface 1650 indicating that, according to an example embodiment, a side conversation between two participants has been disabled. The user interface 1650 is displayed to the third participant 1502C discussed above with respect to FIGS. 15A - 15C and 16A. A side conversation between the first participant 1502A and the third participant 1502C is represented by a tunnel graphical element 1655. Overlaying the tunnel graphical element 1655 is an icon 1660 visually indicating the side conversation is disabled by the host. In some embodiments, the icon 1660 is a lightning bolt as pictured. In some embodiments, the tunnel graphical element 1655 is also displayed as a predefined color that indicates the side conversation is disabled (e.g., red). In some embodiments, the predefined color indicating the side conversation is disabled is a color that is equivalent to the predefined color displayed when the side conversation is muted. In other embodiments, the two colors are different.

In some embodiments, a side conversation participant can permanently leave the side conversation by selecting a control designated for said purpose, such as a "desk buddy" icon. In some embodiments, leaving the side conversation returns the participants view to a view of the primary collaboration session.

In some embodiments, a host is provided with an ability to remove a participant from a side conversation. When the host exercises this capability, some of the disclosed embodiments involve preventing the participant from rejoining the side conversation or initiating a new side conversation with participants of the first side conversation. In some embodiments, the host is provided with a user interface control that returns the ability for the participant to join a side conversation with certain participants. Some embodiments provide side conversation participants with an ability to request reassignment away from the side conversation (e.g., via an update to the virtual collaboration layout).

Figure 17:
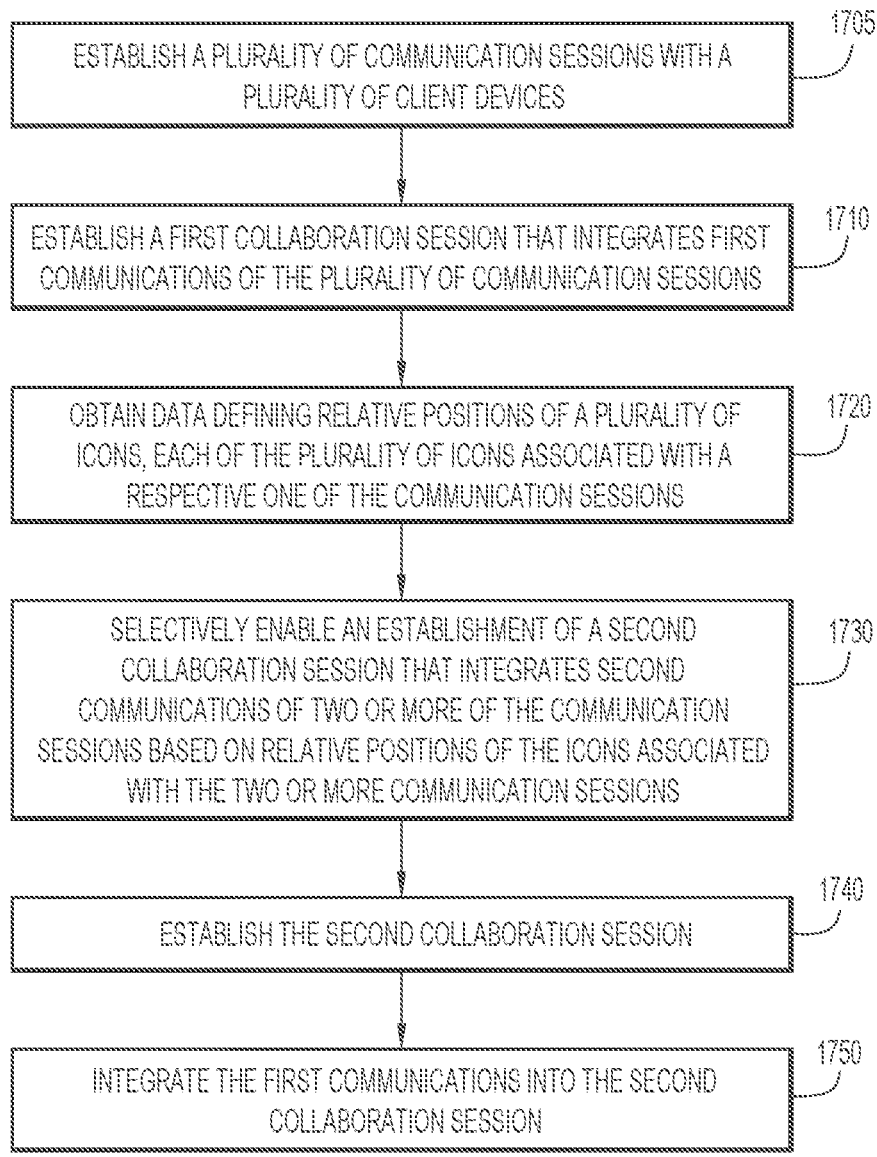
FIG. 17 is a flowchart of a method of selectively enabling a side conversation according to an example embodiment.

FIG. 17 is a flowchart of a method of selectively enabling a side conversation according to an example embodiment. In some embodiments, the method 1700 discussed below with respect to FIG. 17 is performed by a collaboration server, such as the collaboration server 302 discussed above with respect to FIG. 3.

In operation 1705, a plurality of communication sessions is established. Each of the plurality of communication sessions is established with a different client device. For example, as discussed above with respect to FIG. 3, each of the participant client devices 304A-D establishes communication sessions with the collaboration server 302. In some embodiments, each of the communication sessions is established based on different account credentials of a plurality of corresponding collaboration session participants. For example, each participant provides, in some embodiments, an account name and/or a password of an account maintained by the collaboration system. The collaboration server identifies the participant based on the credentials.

Each communication session includes at least one or more of an audio input channels (e.g., generated by the respective client device), an audio output channel (e.g., providing to the respective client device by the collaboration server), a video input channel (e.g., generated by the respective client device), and a video output channel (e.g., provided to the respective client device).

In operation 1710, a first collaboration session is established that integrates first communications of the plurality of communication sessions. In some embodiments of method 1700, the first collaboration session is analogous to a primary collaboration session discussed above. Integrating the first communications includes, in some embodiments, generating an aggregated audio stream that selectively includes audio input channel data of one or more of the communication sessions. For example, some audio input channel data from some participant client devices is not aggregated when the client device's respective communication channel is muted. Integrating the first communications includes, in some embodiments, generating a video output channel to each of the client devices based on select video input channel data from one or more of the participant client devices. For example, as discussed above, a participant in a side conversation is provided with a display of video data from other participants included in the side conversation, at least in some embodiments. In some embodiments, video data of fellow participants in a side conversation is prioritized for display over other video data of participants of the primary collaboration session but not included in a side conversation.

In operation 1720, data is obtained that defines relative positions of a plurality of icons. Each of the icons represents one of the plurality of communication sessions (e.g., and/or its respective participant). For example, as discussed above, virtual positions of participants in a collaboration session are defined by some of the disclosed embodiments, such as the virtual positions discussed above with respect to FIG. 3, FIG. 4A, FIG. 4B, FIG. 8, FIG. 9, FIG. 11 and/or FIG. 12. In some embodiments, each virtual position is defined based on coordinate values within a two-dimensional plane (e.g., x, y values relative to an origin point, such as discussed above with respect to the x axis 920, y axis 930, and origin 945 of FIG. 9).

In some embodiments of operation 1720, one of the plurality of icons is designated as a host icon. The host icon represents a host of the first collaboration session. The host icon is also associated with one of the plurality of communication sessions. The one communication session is also designated as a host communication session. The host communication session is provided, in some embodiments, with different displays and/or controls to facilitate management of the first collaboration session, and any other collaboration sessions (e.g., for side conversations) that result from the first collaboration session. In some embodiments, a volume of host communications of the host communication session (e.g., a volume of an audio input channel of the host communication session) within each of the other communication sessions integrated within the first collaboration session (e.g., provided as an audio output channel to each of the other communication sessions) is set based on a position of the host icon relative to a position of an icon associated with each of the other communication sessions. Thus, each participant receives host audio at a volume relative to the host icon's distance from the icon representing the respective participant.

In some embodiments, a user interface is provided to the host, via the host communication session, indicating the relative positions of the icons. FIG. 9 above is one representation of such a user interface. In some embodiments, the user interface includes any one of the preconfigured virtual seating charts illustrated above with respect to FIG. 8. In some embodiments, the icons are grouped via visual indicators according to side conversations in which the icon's respective participant is. For example, FIG. 11 illustrates an example user interface that groups icons according to membership in a side conversation. As discussed above, in some embodiments, the user interface differentially delineates groups of participants based on a level of activity of the group's respective side conversation.

In some embodiments, input is received from the host communication session indicating a change in the relative positions of two or more of the plurality of icons. For example, as discussed above, some embodiments provide a drag-and-drop interface to the host that facilitate movement or swapping of participant icons within a virtual collaboration layout. In some cases, a location of a participant of a side conversation changes in a manner that makes the participant ineligible to continue to participate in the side conversation (e.g., the participant is moved within the virtual collaboration layout such that their distance from other side conversation participants within the virtual collaboration layout is incompatible with the side conversation). Thus, movement of a participant within a virtual collaboration layout causes, in at least some embodiments, a reevaluation of one or more participants and their continuing eligibility to participate in active side conversations (e.g., eligibility based on a distance between the participant's icon and other icons of other participants of the side conversation). If the participant is no longer eligible to be included in the side conversation, they are removed from the side conversation, at least in some embodiments.

In some embodiments, input is received associating a name with one or more of the plurality of icons. In some embodiments, name information is obtained from account information associated with each communication session, and the name information is associated with the icons based on the associations of the icons and the communication sessions. Thus, a user's name is automatically associated with an icon based on their login credentials. In some embodiments, input defining a modification of one or more associations between names and icons is received. For example, a host provides input, in some embodiments, that swaps two names associated with two icons. The swapping modifies associations between two different names and two of the icons. This modification of an association between a name and an icon results in a change in a distance, within the virtual collaboration layout, of a first participant associated with a first name of the swapped names and other participants in a side conversation in which the first participant is engaged. If the distance exceeds a predefined threshold, the first participant is removed from the side conversation. Similarly, the swap can modify a second distance, within the virtual collaboration layout, of a second participant associated with a second name of the swapped names, and effect the second participant's eligibility to engage in a side conversation.

Similar to the swap example above, other modifications of icon locations within the virtual collaboration layout and/or a modification of locations of names within the virtual collaboration layout can, in some circumstances, result in one or more participants being ineligible for existing side conversations in which they are participating, while also resulting in one or more participants becoming eligible to join existing or potential side conversations in which those participants are not currently participating. Thus, as a result of such a modification, participants become eligible and/or ineligible for a variety of side conversations, at least in some embodiments. Thus, for example, an additional communication session is, in some circumstances, added to a side conversation, or at least eligible to be added to a side conversation, based on a change or modification to the visual layout.

Operation 1730 selectively enables establishment of a second collaboration session (e.g., a side conversation) that integrates second communications of two or more communication sessions of the plurality of communication sessions. The selective enablement is based on relative positions of the icons associated with the two or more communication sessions. In some embodiments, operation 1730 operates separately for each of the communication sessions integrated into the first collaboration session. For example, in some embodiments, for each participant in the first collaboration session (except perhaps, for the host), operation 1730 determines other participants of the first collaboration session that are eligible for establishing a side conversation with the participant. If a particular participant is eligible to engage in a side conversation with a first participant, in some embodiments, operation 1730 enables a user interface control on a display of the first participant that is configured to initiate a side conversation with the particular participant.

In some embodiments, the selective enablement is based on a virtual distance between two icons representing the first participant and the particular participant. Thus, as discussed above, if each participant has a corresponding icon representing the participant, and that icon has defined coordinates within a two-dimensional space, a distance within the two-dimensional virtual space is determined between the two icons representing the first participant and the particular participant, in some embodiments. If the distance is below a predefined distance threshold, a side conversation between the two participants is enabled, and otherwise, the side conversation between the two participants is disabled. In some embodiments, as discussed above with respect to FIG. 9, each of a horizontal and vertical dimension of the two-dimensional space is associated with a different distance threshold. Thus, in these embodiments, a distance in one dimension (e.g., distance 958A) is determined and compared with the respective threshold, and a second distance (e.g., distance 958B) in the second dimension is determined and compared to its respective threshold. In some embodiments, if both distances are below their respective thresholds, then the side conversation is enabled, otherwise it is disabled.

In some embodiments, distance determinations are made between each participant and every other participant, with appropriate comparisons made to the predefined threshold(s) to determine a set of eligible participants with which a particular participant can engage in side conversations.

In operation 1740, the second collaboration session is established. Thus, in the embodiment of method 1700 described here, establishment of the second collaboration session is enabled by operation 1730. The second collaboration session is analogous to a side conversation or "whisper mode" conversation as discussed herein. However, in other embodiments, the establishment of the second collaboration session is not enabled, and thus, operation 1740 is not performed.

Based on the establishment of the second collaboration session, participants of the second collaboration session each receive, in at least some embodiments, a video feed of at least one other participant in the second collaboration session. Thus, some embodiments implement a prioritization of collaboration sessions, with a primary collaboration session set as a first priority, and a side conversation generated from the primary collaboration session set to a second priority. Decisions regarding which audio and/or video data to provide to a participant can include comparing priorities of the different collaboration sessions of the participant. Thus, some embodiments prioritize display of participants in a side conversation to other participants of the side conversation relative to displaying primary collaboration session participants not included in or excluded from the side conversation. Some embodiments selectively integrate audio feeds from participants in a side conversation and provide the integrated audio feed to each of the participants. In some embodiments, audio feeds of other participants not included in the side conversation are also included in the integrated audio feed, but at a lower volume than the audio feeds of the side conversation participants.

In operation 1750, first communications of the first collaboration session (e.g., the primary collaboration session) are integrated into the second collaboration session (e.g., the side conversation). Thus, participants in the second collaboration session are able to receive audio data of the first collaboration session. In some embodiments, at least some video data associated with the first collaboration session is also displayed to one or more of the participants in the second collaboration session while the second collaboration session is active.

In some embodiments, a first volume of the first communications within the second collaboration session is set to a first level that is lower than a second volume of the second communications within the second collaboration session. In some embodiments, upon integrating the first communications into the second collaboration session, the second communications are inhibited from being included within the first collaboration session. Thus, in some embodiments, at least audio input generated by participants of the second collaboration session is not provided to participants excluded from the second collaboration session.

In some embodiments, the inhibiting of the second communications from being included in the first collaboration session is based on an input volume of the second communications. Thus, for example, a participant in the second collaboration session can make their voice heard in the first collaboration session, in some embodiments, by raising the volume of their voice above a predefined threshold level. In some other embodiments, participants are provided with user interface controls that allow the participants to selectively inhibit their audio channel from being included in the first collaboration session. Thus, inhibiting of the second communications from being included in the first collaboration session is based on to what extent the participants in the second collaboration session have selected to inhibit their individual audio channels from inclusion in the first collaboration session. In some embodiments, a default audio setting inhibits inclusion of second communications from being included in the first collaboration session. Some embodiments provide a user interface to a participant in the second collaboration session that allows the participant to direct their audio channel to the first collaboration session.

Some embodiments of method 1700 include detecting that an icon associated with the host communication session is within a threshold distance of a second icon associated with a second communication session; and establishing a third collaboration session that includes the host communication session and the second communication session. An example of this is discussed above with respect to FIGS. 4A and 4B. In some embodiments, third communications of the third collaboration session are inhibited from inclusion in the first collaboration session. Thus, for example, a host can approach a participant within the virtual collaboration layout, and initiate a private conversation (e.g., third collaboration session) with the participant, without other participants of the primary collaboration session being able to hear the private conversation.

As discussed above, some embodiments provide particular management information to the host communication session. Display of this management information is inhibited from being displayed to other collaboration session participants. Some of this management information includes, in some embodiments, status information relating to the first collaboration session and/or additional collaboration sessions (e.g., side conversations) that were initiated from within the first collaboration session (e.g., and managed by the host). As discussed above, this status information includes, in some embodiments, one or more of an amount or frequency of conversation occurring within each of the additional collaboration sessions, an elapsed time that each of the additional collaboration sessions have been active, or other management information.

In some embodiments, input is received, from the host communication session. The input indicates a warning operation be provided to communication sessions included in the second collaboration session. For example, as discussed above with respect to FIG. 16A, a host is provided with a user interface control that causes display of a warning indication (e.g., the warning icon 1610) on a display of each participant in a side conversation (e.g., the second collaboration session). In some embodiments, a host issues the warning in response to viewing one or more of the management information described above, such as a frequency, elapsed time, or amount of communication occurring within a side conversation (e.g., the second collaboration session).

In some embodiments, a host requests to join a side conversation (e.g., such as the second collaboration session). The request to join, in some circumstances, is a result of the host observing management information relating to the side conversation. The host communication session is then integrated with the side conversation in response to the request. This allows the host to communicate with the participants of the side conversation. In some embodiments, host communications are then inhibited from any communication sessions not included in the side conversation (e.g., the second collaboration session).

In some embodiments, input is received from the host communication session, the input indicating a mute operation be performed on a side conversation (e.g., such as the second collaboration session). For example, FIG. 16B shows an example of a display provided to a participant in a side conversation when the host disables or mutes the side conversation.

FIG. 18 is a hardware block diagram of a device 1800 that may perform functions associated with operations discussed herein in connection with the techniques depicted in any one or more of FIGS. 1-17. In various embodiments, any of the devices described above (e.g., a client device or a collaboration server) implement, in some embodiments, a computing architecture analogous to that described below with respect to the device 1800.

In at least one embodiment, the device 1800 may include one or more processor(s) 1802, one or more memory element(s) 1804, storage 1806, a bus 1808, one or more network processor unit(s) 1810 interconnected with one or more network input/output (I/O) interface(s) 1812, one or more I/O interface(s) 1814, and control logic 1820. In various embodiments, instructions associated with logic for device 1800 can overlap in any manner and are not limited to the specific allocation of instructions and/or operations described herein.

In at least one embodiment, processor(s) 1802 is/are at least one hardware processor configured to execute various tasks, operations and/or functions for device 1800 as described herein according to software and/or instructions configured for device 1800. Processor(s) 1802 (e.g., a hardware processor) can execute any type of instructions associated with data to achieve the operations detailed herein. In one example, processor(s) 1802 can transform an element or an article (e.g., data, information) from one state or thing to another state or thing. Any of potential processing elements, microprocessors, digital signal processor, baseband signal processor, modem, physical layer (PHY), controllers, systems, managers, logic, and/or machines described herein can be construed as being encompassed within the broad term 'processor'.

In at least one embodiment, memory element(s) 1804 and/or storage 1806 is/are configured to store data, information, software, and/or instructions associated with device 1800, and/or logic configured for memory element(s) 1804 and/or storage 1806. For example, any logic described herein (e.g., control logic 1820) can, in various embodiments, be stored for device 1800 using any combination of memory element(s) 1804 and/or storage 1806. Note that in some embodiments, storage 1806 can be consolidated with memory element(s) 1804 (or vice versa), or can overlap/exist in any other suitable manner.

In at least one embodiment, bus 1808 can be configured as an interface that enables one or more elements of device 1800 to communicate in order to exchange information and/or data. Bus 1808 can be implemented with any architecture designed for passing control, data and/or information between processors, memory elements/storage, peripheral devices, and/or any other hardware and/or software components that may be configured for device 1800. In at least one embodiment, bus 1808 may be implemented as a fast kernel-hosted interconnect, potentially using shared memory between processes (e.g., logic), which can enable efficient communication paths between the processes.

In various embodiments, network processor unit(s) 1810 may enable communication between device 1800 and other systems, devices, or entities, via network I/O interface(s) 1812 (wired and/or wireless) to facilitate operations discussed for various embodiments described herein. In various embodiments, network processor unit(s) 1810 can be configured as a combination of hardware and/or software, such as one or more Ethernet driver(s) and/or controller(s) or interface cards, Fibre Channel (e.g., optical) driver(s) and/or controller(s), wireless receivers/ transmitters/transceivers, baseband processor(s)/modem(s), and/or other similar network interface driver(s) and/or controller(s) now known or hereafter developed to enable communications between device 1800 and other systems, devices, or entities to facilitate operations for various embodiments described herein. In various embodiments, network I/O interface(s) 1812 can be configured as one or more Ethernet port(s), Fibre Channel ports, any other I/O port(s), and/or antenna(s)/antenna array(s) now known or hereafter developed. Thus, the network processor unit(s) 1810 and/or network I/O interface(s) 1812 may include suitable interfaces for receiving, transmitting, and/or otherwise communicating data and/or information in a network environment.

I/O interface(s) 1814 allow for input and output of data and/or information with other entities that may be connected to device 1800. For example, I/O interface(s) 1814 may provide a connection to external devices such as a display, keyboard, keypad, a touch screen, a camera, a microphone, and/or any other suitable input and/or output device now known or hereafter developed. This may be the case, in particular, when the device 1800 serves as a user device described herein. In some instances, external devices can also include portable computer readable (non-transitory) storage media such as database systems, thumb drives, portable optical or magnetic disks, and memory cards. In still some instances, external devices can be a mechanism to display data to a user, such as, for example, a computer monitor, a display screen, such as display, particularly when the device 1800 serves as a user device as described herein.

In various embodiments, control logic 1820 can include instructions that, when executed, cause processor(s) 1802 to perform operations, which can include, but not be limited to, providing overall control operations of computing device; interacting with other entities, systems, etc. described herein; maintaining and/or interacting with stored data, information, parameters, etc. (e.g., memory element(s), storage, data structures, databases, tables, etc.); combinations thereof; and/or the like to facilitate various operations for embodiments described herein.

The programs described herein (e.g., control logic 1820) may be identified based upon application(s) for which they are implemented in a specific embodiment. However, it should be appreciated that any particular program nomenclature herein is used merely for convenience; thus, embodiments herein should not be limited to use(s) solely described in any specific application(s) identified and/or implied by such nomenclature.

In various embodiments, entities as described herein may store data/information in any suitable volatile and/or non-volatile memory item (e.g., magnetic hard disk drive, solid state hard drive, semiconductor storage device, random access memory (RAM), read only memory (ROM), erasable programmable read only memory (EPROM), application specific integrated circuit (ASIC), etc.), software, logic (fixed logic, hardware logic, programmable logic, analog logic, digital logic), hardware, and/or in any other suitable component, device, element, and/or object as may be appropriate. Any of the memory items discussed herein should be construed as being encompassed within the broad term 'memory element'. Data/information being tracked and/or sent to one or more entities as discussed herein could be provided in any database, table, register, list, cache, storage, and/or storage structure: all of which can be referenced at any suitable timeframe. Any such storage options may also be included within the broad term 'memory element' as used herein.

Note that in certain example implementations, operations as set forth herein may be implemented by logic encoded in one or more tangible media that is capable of storing instructions and/or digital information and may be inclusive of non-transitory tangible media and/or non-transitory computer readable storage media (e.g., embedded logic provided in: an ASIC, digital signal processing (DSP) instructions, software [potentially inclusive of object code and source code], etc.) for execution by one or more processor(s), and/or other similar machine, etc. Generally, memory element(s) 1804 and/or storage 1806 can store data, software, code, instructions (e.g., processor instructions), logic, parameters, combinations thereof, and/or the like used for operations described herein. This includes memory element(s) 1804 and/or storage 1806 being able to store data, software, code, instructions (e.g., processor instructions), logic, parameters, combinations thereof, or the like that are executed to carry out operations in accordance with teachings of the present disclosure.

In some instances, software of the present embodiments may be available via a non-transitory computer useable medium (e.g., magnetic or optical mediums, magneto-optic mediums, compact disc (CD) read only memory (ROM) (CD-ROM), digital video disc (DVD), memory devices, etc.) of a stationary or portable program product apparatus, downloadable file(s), file wrapper(s), object(s), package(s), container(s), and/or the like. In some instances, non-transitory computer readable storage media may also be removable. For example, a removable hard drive may be used for memory/storage in some implementations. Other examples may include optical and magnetic disks, thumb drives, and smart cards that can be inserted and/or otherwise connected to a computing device for transfer onto another computer readable storage medium.

Variations and Implementations

Embodiments described herein may include one or more networks, which can represent a series of points and/or network elements of interconnected communication paths for receiving and/or transmitting messages (e.g., packets of information) that propagate through the one or more networks. These network elements offer communicative interfaces that facilitate communications between the network elements. A network can include any number of hardware and/or software elements coupled to (and in communication with) each other through a communication medium. Such networks can include, but are not limited to, any local area network (LAN), virtual LAN (VLAN), wide area network (WAN) (e.g., the Internet), software defined WAN (SD-WAN), wireless local area (WLA) access network, wireless wide area (WWA) access network, metropolitan area network (MAN), Intranet, Extranet, virtual private network (VPN), Low Power Network (LPN), Low Power Wide Area Network (LPWAN), Machine to Machine (M2M) network, Internet of Things (IoT) network, Ethernet network/switching system, any other appropriate architecture and/or system that facilitates communications in a network environment, and/or any suitable combination thereof.

Networks through which communications propagate can use any suitable technologies for communications including wireless communications (e.g., fourth generation (4G)/ fifth generation (5G)/ next generation (nG), an IEEE 802.11 (e.g., Wi-Fi®/Wi-Fi6®), IEEE 802.15 (e.g. Wireless Personal Area Networks (WPAN)), IEEE 802.16 (e.g., Worldwide Interoperability for Microwave Access (WiMAX)), Radio-Frequency Identification (RFID), Near Field Communication (NFC), Bluetooth™, millimeter (mm).wave, Ultra-Wideband (UWB), etc.), and/or wired communications (e.g., T1 lines, T3 lines, digital subscriber lines (DSL), Ethernet, Fibre Channel, etc.). Generally, any suitable means of communications may be used such as but not limited to electric, sound, light, infrared, qubits, and/or radio to facilitate communications through one or more networks in accordance with embodiments herein. Communications, interactions, operations, etc. as discussed for various embodiments described herein may be performed among entities that may directly or indirectly connected utilizing any algorithms, communication protocols, interfaces, etc. (proprietary and/or non-proprietary) that allow for the exchange of data and/or information.

Communications in a network environment can be referred to herein as 'messages', 'messaging', 'signaling', 'data', 'content', 'objects', 'requests', 'queries', 'responses', 'replies', etc. which may be inclusive of packets. As referred to herein and in the claims, the term 'packet' may be used in a generic sense to include packets, frames, segments, datagrams, and/or any other generic units that may be used to transmit communications in a network environment. Generally, a packet is a formatted unit of data that can contain control or routing information (e.g., source and destination address, source and destination port, etc.) and data, which is also sometimes referred to as a 'payload', 'data payload', and variations thereof. In some embodiments, control or routing information, management information, or the like can be included in packet fields, such as within header(s) and/or trailer(s) of packets. Internet Protocol (IP) addresses discussed herein and in the claims can include any IP version 4 (IPv4) and/or IP version 6 (IPv6) addresses.

To the extent that embodiments presented herein relate to the storage of data, the embodiments may employ any number of any conventional or other databases, data stores or storage structures (e.g., files, databases, data structures, data or other repositories, etc.) to store information.

Note that in this Specification, references to various features (e.g., elements, structures, nodes, modules, components, engines, logic, steps, operations, functions, characteristics, etc.) included in 'one embodiment', 'example embodiment', 'an embodiment', 'another embodiment', 'certain embodiments', 'some embodiments', 'various embodiments', 'other embodiments', 'alternative embodiment', and the like are intended to mean that any such features are included in one or more embodiments of the present disclosure, but may or may not necessarily be combined in the same embodiments. Note also that a module, engine, client, controller, function, logic or the like as used herein in this Specification, can be inclusive of an executable file comprising instructions that can be understood and processed on a server, computer, processor, machine, compute node, combinations thereof, or the like and may further include library modules loaded during execution, object files, system files, hardware logic, software logic, or any other executable modules.

It is also noted that the operations and steps described with reference to the preceding figures illustrate only some of the possible scenarios that may be executed by one or more entities discussed herein. Some of these operations may be deleted or removed where appropriate, or these steps may be modified or changed considerably without departing from the scope of the presented concepts. In addition, the timing and sequence of these operations may be altered considerably and still achieve the results taught in this disclosure. The preceding operational flows have been offered for purposes of example and discussion. Substantial flexibility is provided by the embodiments in that any suitable arrangements, chronologies, configurations, and timing mechanisms may be provided without departing from the teachings of the discussed concepts.

As used herein, unless expressly stated to the contrary, use of the phrase 'at least one of,' 'one or more of', 'and/or', variations thereof, or the like are open-ended expressions that are both conjunctive and disjunctive in operation for any and all possible combination of the associated listed items. For example, each of the expressions 'at least one of X, Y and Z', 'at least one of X, Y or Z', 'one or more of X, Y and Z', 'one or more of X, Y or Z' and 'X, Y and/or Z' can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z.

Additionally, unless expressly stated to the contrary, the terms 'first', 'second', 'third', etc., are intended to distinguish the particular nouns they modify (e.g., element, condition, node, module, activity, operation, etc.). Unless expressly stated to the contrary, the use of these terms is not intended to indicate any type of order, rank, importance, temporal sequence, or hierarchy of the modified noun. For example, 'first X' and 'second X' are intended to designate two 'X' elements that are not necessarily limited by any order, rank, importance, temporal sequence, or hierarchy of the two elements. Further as referred to herein, 'at least one of' and 'one or more of' can be represented using the '(s)' nomenclature (e.g., one or more element(s)).

In one form, a method is provided that comprises establishing a plurality of communication sessions with a plurality of client devices, establishing a first collaboration session that integrates first communications of the plurality of communication sessions, obtaining data defining relative positions of a plurality of icons to be presented on displays of the plurality of client devices, each of the plurality of icons associated with a respective one of the communication sessions, selectively enabling an establishment of a second collaboration session that integrates second communications of two or more of the communication sessions based on relative positions of the icons associated with the two or more communication sessions, establishing the second collaboration session, and integrating the first communications of the first collaboration session into the second collaboration session.

In another form, an apparatus is provided that comprises a network interface configured to enable network communications, one or more processors, and one or more memories storing instructions that when executed configure the one or more processors to perform operations comprising establishing a plurality of communication sessions with a plurality of client devices, establishing a first collaboration session that integrates first communications of the plurality of communication sessions, obtaining data defining relative positions of a plurality of icons to be presented on displays of the plurality of client devices, each of the plurality of icons associated with a respective one of the communication sessions, selectively enabling an establishment of a second collaboration session that integrates second communications of two or more of the communication sessions based on relative positions of the icons associated with the two or more communication sessions, establishing the second collaboration session; and integrating the first communications of the first collaboration session into the second collaboration session.

The methods presented herein may be embodied in a non-transitory computer readable storage medium comprising instructions that when executed configure one or more processors to perform the operations of the method.

One or more advantages described herein are not meant to suggest that any one of the embodiments described herein necessarily provides all of the described advantages or that all the embodiments of the present disclosure necessarily provide any one of the described advantages. Numerous other changes, substitutions, variations, alterations, and/or modifications may be ascertained to one skilled in the art and it is intended that the present disclosure encompass all such changes, substitutions, variations, alterations, and/or modifications as falling within the scope of the appended claims.

What is claimed is:

1. A method comprising:
   establishing a plurality of communication sessions with a plurality of client devices;
   establishing a first collaboration session that integrates first communications of the plurality of communication sessions;
   obtaining data defining relative positions of a plurality of icons to be presented on displays of the plurality of client devices, each of the plurality of icons associated with a respective one of the plurality of communication sessions, wherein a different name is associated with each of the plurality of icons;
   selectively enabling an establishment of a second collaboration session that integrates second communications of two or more communication sessions of the plurality of communication sessions based on relative positions of the icons associated with the two or more communication sessions;
   establishing the second collaboration session;
   integrating the first communications of the first collaboration session into the second collaboration session;
   obtaining data indicating associations between two different names and two of the icons have been swapped; and
   removing one of the two or more communication sessions from the second collaboration session based on the data indicating the associations have been swapped.

2. The method of claim 1, further comprising:
   designating one of the plurality of icons as a host icon, the host icon associated with a host communication session of the plurality of communication sessions; and
   setting a volume of host communications of the host communication session within each of the communication sessions integrated within the first collaboration session based on a position of the host icon relative to a position of an icon associated with the communication session.

3. The method of claim 2, further comprising:
   detecting that the host icon associated with the host communication session is within a threshold distance of a second icon associated with a second communication session; and
   establishing a third collaboration session that includes the host communication session and the second communication session.

4. The method of claim 3, further comprising:
   integrating third communications of the host communication session and the second communication session into the third collaboration session, while inhibiting the third communications from being included in the second collaboration session and the first collaboration session.

5. The method of claim 2, further comprising determining an elapsed time since establishment of the second collaboration session, and displaying, within the host communication session an indication of the elapsed time.

6. The method of claim 5, further comprising:
   obtaining input, via the host communication session, indicating a warning operation on the second collaboration session; and
   causing display, via each of the two or more communication sessions, a warning in response to the input.

7. The method of claim 5, further comprising:
   receiving input, via the host communication session, indicating a mute operation on the second collaboration session; and
   muting the second collaboration session in response to the input.

8. The method of claim 2, further comprising:
   obtaining input, via the host communication session, the input indicating a request to join the second collaboration session; and
   adding the host communication session to the second collaboration session.

9. The method of claim 2, further comprising causing presentation, via the host communication session, of a visual indicator that groups icons associated with the two or more communication sessions.

10. The method of claim 1, further comprising:
    obtaining data indicating a modification to the relative positions of the plurality of icons; and
    removing one of the two or more communication sessions from the second collaboration session based on the modification.

11. The method of claim 1, further comprising inhibiting the second communications from the first collaboration session based on an input volume of the second communications.

12. The method of claim 1, further comprising determining an amount of communication within the second collaboration session, and causing to be displayed, within a host communication session an indication of the amount of communication.

13. The method of claim 1, further comprising prioritizing display, within each of the two or more communication sessions of the second collaboration session, video feeds from other of the two or more communication sessions relative to video feeds from communication sessions that are included in the first collaboration session but are excluded from the second collaboration session.

14. The method of claim 1, further comprising:
    designating one of the plurality of icons as a host icon, the host icon associated with a host communication session of the plurality of communication sessions;

detecting that the host icon associated with the host communication session is within a threshold distance of the icons associated with the two or more communication sessions integrated in the second collaboration session; and integrating host communications of the host communication session into the second collaboration session.

15. An apparatus comprising:

a network interface configured to enable network communications;

one or more processors; and one or more memories storing instructions that when executed configure the one or more processors to perform operations comprising:

establishing a plurality of communication sessions with a plurality of client devices;

establishing a first collaboration session that integrates first communications of the plurality of communication sessions;

obtaining data defining relative positions of a plurality of icons to be presented on displays of the plurality of client devices, each of the plurality of icons associated with a respective one of the plurality of communication sessions, wherein a different name is associated with each of the plurality of icons;

selectively enabling an establishment of a second collaboration session that integrates second communications of two or more communication sessions of the plurality of communication sessions based on relative positions of the icons associated with the two or more communication sessions;

establishing the second collaboration session;

integrating the first communications of the first collaboration session into the second collaboration session;

obtaining data indicating associations between two different names and two of the icons have been swapped; and removing one of the two or more communication sessions from the second collaboration session based on the data indicating the associations have been swapped.

16. The apparatus of claim 15, the operations further comprising:

designating one of the plurality of icons as a host icon, the host icon associated with a host communication session of the plurality of communication sessions; and setting a volume of host communications of the host communication session within each of the communication sessions integrated within the first collaboration session based on a position of the host icon relative to a position of an icon associated with the communication session.

17. The apparatus of claim 16, the operations further comprising:

detecting that the host icon associated with the host communication session is within a threshold distance of a second icon associated with a second communication session; and establishing a third collaboration session that includes the host communication session and the second communication session.

18. The apparatus of claim 17, the operations further comprising:

integrating third communications of the host communication session and the second communication session into the third collaboration session, while inhibiting the third communications from being included in the second collaboration session and the first collaboration session.

19. The apparatus of claim 16, the operations further comprising determining an elapsed time since establishment of the second collaboration session, and displaying, within the host communication session an indication of the elapsed time.

20. A non-transitory computer readable storage medium comprising instructions that when executed configure one or more processors to perform operations comprising:

establishing a plurality of communication sessions with a plurality of client devices;

establishing a first collaboration session that integrates first communications of the plurality of communication sessions;

obtaining data defining relative positions of a plurality of icons to be presented on displays of the plurality of client devices, each of the plurality of icons associated with a respective one of the communication sessions;

selectively enabling an establishment of a second collaboration session that integrates second communications of two or more communication sessions of the plurality of communication sessions based on relative positions of the icons associated with the two or more communication sessions;

establishing the second collaboration session;

integrating the first communications of the first collaboration session into the second collaboration session;

obtaining data indicating associations between two different names and two of the icons have been swapped; and removing one of the two or more communication sessions from the second collaboration session based on the data indicating the associations have been swapped.

21. The non-transitory computer readable storage medium of claim 20, the operations further comprising:

designating one of the plurality of icons as a host icon, the host icon associated with a host communication session of the plurality of communication sessions; and setting a volume of host communications of the host communication session within each of the communication sessions integrated within the first collaboration session based on a position of the host icon relative to a position of an icon associated with the communication session.

22. The non-transitory computer readable storage medium of claim 21, the operations further comprising:

detecting that the host icon associated with the host communication session is within a threshold distance of a second icon associated with a second communication session; and establishing a third collaboration session that includes the host communication session and the second communication session.

23. The non-transitory computer readable storage medium of claim 22, the operations further comprising:

integrating third communications of the host communication session and the second communication session into the third collaboration session, while inhibiting the third communications from being included in the second collaboration session and the first collaboration session.

* * * * *

UNITED STATES PATENT AND TRADEMARK OFFICE
CERTIFICATE OF CORRECTION

PATENT NO. : 11,706,264 B2
APPLICATION NO. : 17/385350
DATED : July 18, 2023
INVENTOR(S) : Brian C. Powell et al.

It is certified that error appears in the above-identified patent and that said Letters Patent is hereby corrected as shown below:

In the Claims

Claim 20, Column 28, Line 21, please replace "one of the communication sessions;" with --one of the communication sessions, wherein a different name is associated with each of the plurality of icons;--

Signed and Sealed this
Seventh Day of November, 2023

Katherine Kelly Vidal
*Director of the United States Patent and Trademark Office*